(12) United States Patent
Warashina et al.

(10) Patent No.: US 11,253,129 B2
(45) Date of Patent: Feb. 22, 2022

(54) HYGIENIC THIN-LEAF PAPER

(71) Applicant: DAIO PAPER CORPORATION, Ehime (JP)

(72) Inventors: Shinichi Warashina, Shizuoka (JP); Hirohiko Kato, Shizuoka (JP)

(73) Assignee: DAIO PAPER CORPORATION, Ehime (JP)

( * ) Notice: Subject to any disclaimer, the term of this patent is extended or adjusted under 35 U.S.C. 154(b) by 164 days.

(21) Appl. No.: 16/481,528

(22) PCT Filed: Mar. 2, 2018

(86) PCT No.: PCT/JP2018/008069
§ 371 (c)(1),
(2) Date: Jul. 29, 2019

(87) PCT Pub. No.: WO2018/159824
PCT Pub. Date: Sep. 7, 2018

(65) Prior Publication Data
US 2019/0380556 A1 Dec. 19, 2019

(30) Foreign Application Priority Data
Mar. 2, 2017 (JP) .............................. JP2017-039662

(51) Int. Cl.
*A47L 13/16* (2006.01)
*A47K 10/16* (2006.01)
*D21H 27/30* (2006.01)

(52) U.S. Cl.
CPC .............. *A47L 13/16* (2013.01); *A47K 10/16* (2013.01); *D21H 27/30* (2013.01)

(58) Field of Classification Search
CPC ........ D21H 27/40; D21H 27/02; D21H 27/00; D21H 27/002; D21H 27/30; D21H 27/32;
(Continued)

(56) References Cited

U.S. PATENT DOCUMENTS

| 5,846,636 | A  | 12/1998 | Ruppel et al. |
| 6,086,715 | A  | 7/2000  | NcNeil |
| 6,755,928 | B1 | 6/2004  | Biagiotti |
| 8,409,404 | B2 | 4/2013  | Harper et al. |

(Continued)

FOREIGN PATENT DOCUMENTS

| EP | 1970193 | 9/2008 |
| EP | 2095935 | 9/2009 |

(Continued)

OTHER PUBLICATIONS

Extended European Search Report for 18760825.2 dated Oct. 21, 2020.

(Continued)

*Primary Examiner* — Jose A Fortuna
(74) *Attorney, Agent, or Firm* — IPUSA, PLLC

(57) ABSTRACT

A hygienic thin-leaf paper including a first sheet having front and back surfaces, on which embossed protrusions and embossed recesses corresponding to the embossed protrusions are respectively formed; and a second sheet having front and back surfaces, on which embossed protrusions and embossed recesses corresponding to the embossed protrusions are respectively formed, wherein the first sheet and the second sheet are integrated by facing the surfaces formed with the embossed protrusions in a nested form, wherein each of the first sheet and the second sheet have an embossed portion, on which the embossed protrusions and non-embossed-protrusion portions are formed, wherein at least one of the first sheet and the second sheets have a non-embossed portion, on which the embossed protrusions and the non-embossed portions are not formed, and wherein the non-embossed portion is in a shape without having an intersection.

13 Claims, 21 Drawing Sheets

(58) Field of Classification Search
CPC ............... B31F 1/07; B31F 2201/0761; B31F 2201/0764; B31F 2201/0774; B32B 29/005; B32B 2432/00; B32B 2554/00; B32B 2555/00; A47L 13/16; A47K 10/16
See application file for complete search history.

(56) References Cited

U.S. PATENT DOCUMENTS

| | | | | |
|---|---|---|---|---|
| 9,663,900 | B2* | 5/2017 | Jeannot | B32B 29/005 |
| 10,422,083 | B2* | 9/2019 | Baum | D21H 27/005 |
| 10,689,810 | B2* | 6/2020 | Baum | D21H 27/005 |
| 2013/0344294 | A1* | 12/2013 | Eilert | B32B 29/08 |
| | | | | 428/172 |
| 2015/0225903 | A1* | 8/2015 | Jeannot | B32B 29/005 |
| | | | | 162/132 |
| 2019/0352853 | A1* | 11/2019 | Baum | D21H 27/002 |
| 2019/0380556 | A1* | 12/2019 | Warashina | B32B 3/266 |
| 2020/0171783 | A1* | 6/2020 | Warashina | D21H 27/002 |
| 2021/0180260 | A1* | 6/2021 | Satake Neto | A47K 10/16 |

FOREIGN PATENT DOCUMENTS

| | | | | |
|---|---|---|---|---|
| IT | FI20100029 | | 9/2011 | |
| JP | H06-028951 | | 2/1994 | |
| JP | 2002-505207 | | 2/2002 | |
| JP | 2003-116741 | | 4/2003 | |
| JP | 2003-526394 | | 9/2003 | |
| JP | 2004-244772 | | 9/2004 | |
| JP | 2008-113695 | | 5/2008 | |
| JP | 2008-208501 | | 9/2008 | |
| JP | 2010-148803 | | 7/2010 | |
| JP | 2013-208298 | | 10/2013 | |
| JP | 2019208854 A | * | 12/2019 | ............ D21H 27/40 |
| WO | 02/103112 | | 12/2002 | |

OTHER PUBLICATIONS

International Search Report for PCT/JP2018/008069 dated May 29, 2018.

* cited by examiner (A)

(B)

(A)

(B)

(C)

(A)

(B)

(A)

(B)

(A)

(B)

(A)

(B)

(A)

(B)

HYGIENIC THIN-LEAF PAPER

TECHNICAL FIELD

The present invention relates to hygienic thin-leaf paper.

BACKGROUND ART

Hygienic thin-leaf paper such as kitchen paper is known to have a laminated structure in which sheets such as crepe paper provided with embossing work are laminated.

Each sheet of the conventional hygienic thin-leaf paper may be provided with embossing work to form a protrusion (hereinafter, referred to as an embossed protrusion) on one surface and a recess (hereinafter, referred to as an embossed recess) corresponding to the embossed protrusion on the other surface in order to give a capability of absorbing oil and moisture.

Then, by laminating these sheets, a space (an emboss space) is formed between the laminated sheets, and the oil absorbed in the embossed space is retained.

Further, in the hygienic thin-leaf paper of this kind, in order to improve designability and absorption performance (the amount of moisture and oil absorption, retention, etc.), the embossed protrusion formed by the embossing work, the embossed recess corresponding to the embossed protrusion, and a portion having no embossed protrusion surrounded by multiple embossed protrusions (hereinafter, referred to as the non-embossed protrusion) are formed on each sheet.

Further, a non-embossed space in which the embossed protrusion and a portion without the embossed protrusion (hereinafter, referred to as a non-embossed portion) face each other is formed, and the oil and so on passes through the non-embossed space so that an absorption performance of the oil and so on is improved.

For example, FIG. 2 of Japanese Examined Patent Publication No. 6-28951 (Patent Document 1) discloses a hygienic paper such as a kitchen towel having a laminated structure in a Tip To Tip type, in which two embossed protrusions of two sheets of crepe paper facing each other and bonded (see FIGS. 14-17).

Further, U.S. Pat. No. 8,409,404 (Patent Document 2) discloses a kitchen paper having a laminated structure in a Nested form, in which protrusions are arranged so that the top of the protrusion of one crepe paper is located at a portion (a portion without the protrusions, the portion being surrounded by multiple embossed protrusions when viewing from one crepe paper on the other side) without the protrusion of the other crepe paper (see FIGS. 18 to 21).

Further, Japanese Unexamined Patent Application Publication No. 2008-208501 (Patent Document 3) discloses a kitchen paper, inside which a line-shaped non-embossed space is formed so that lines intersect (see FIGS. 14-21).

RELATED ART DOCUMENT

Patent Document

[Patent Document 1] Japanese Examined Patent Publication No. 6-28951
[Patent Document 2] U.S. Pat. No. 8,409,404
[Patent Document 3] Japanese Unexamined Patent Application Publication No. 2008-208501

SUMMARY OF THE INVENTION

Problem to be Solved by the Invention

However, in the structure of Patent Document 1 (Tip-to-Tip type laminated structure), the strength in the lamination direction (a thickness direction) tends to be lower, and when using hygienic thin-leaf paper (for example, when placing a fried object on a kitchen paper laid on a dish), there is a problem that the oil absorbed by the load stains (backs out) on the backside of hygienic thin-leaf paper (for example, the dish on which a kitchen paper is placed) (see FIGS. 14 to 17).

Further, in the structure of Patent Document 2 (nested type laminated structure), the contact area of the object to be used can be reduced compared to the laminated structure of the tip-tip type. However, because the embossed space in the hygienic thin-leaf paper is small, it is difficult to absorb oil, etc. due to the slight collapse of the embossed space that occurs when the load is applied during use, and the absorbed oil may stain out (see FIGS. 18 to 21).

Furthermore, in the hygienic thin-leaf paper having the non-embossed space disclosed in Patent Document 3, because there is no post due to the embossed protrusion in the non-embossed space, the strength for the load in the thickness direction is reduced.

Accordingly, in the conventional hygienic thin-leaf paper in which such non-embossed space exists, regardless of the laminated structure of the tip-tip type and nested formation, if a load is applied in the thickness direction, the non-embossed space will collapse and the oil absorption performance will be reduced (see FIGS. 14 to 21).

Further, although the strength in the thickness direction can be increased by reducing the non-embossed space, the dispersion property of the oil and so on is reduced by decreasing the volume of the space in the non-embossed space.

Further, because the area of the non-embossed portion in each sheet decreases, the designability property decreases.

Furthermore, when a space where non-embossed spaces intersect is present in a space sandwiched between two sheets, oil and so on accumulates in this intersection, and diffusion of the oil and so on is inhibited. Therefore, the absorption performance is further degraded.

It is an object of the present invention to provide hygienic thin-leaf paper with excellent absorption performance during loading while maintaining absorption performance and designability.

Means for Solving Problems

In order to solve the above-described problem, according to one embodiment, a hygienic thin-leaf paper is provided, wherein: a first sheet having a plurality of embossed portions and embossed irregularities corresponding to the embossed portion; a second sheet having a plurality of embossed portions and embossed irregularities corresponding to the embossed portion; and a second sheet having a hygienic thin-leaf paper having an embossed portion in which the first sheet and the second sheet face each other in a nested form, wherein the first sheet and the second sheet have an embossed portion having a plurality of embossed protrusions and a plurality of non-embossed portions, wherein at least one of the first sheet and the second sheet has a non-embossed portion having a plurality of embossed protrusions and a plurality of non-embossed portions, and wherein the non-embossed portion has a shape wherein the non-embossed portion has no intersection.

Effect of Invention

According to one mode of the present invention, hygienic thin-leaf paper with excellent absorption performance during loading can be provided while maintaining absorption performance and designability.

MODES FOR CARRYING OUT THE INVENTION

Figure 1:
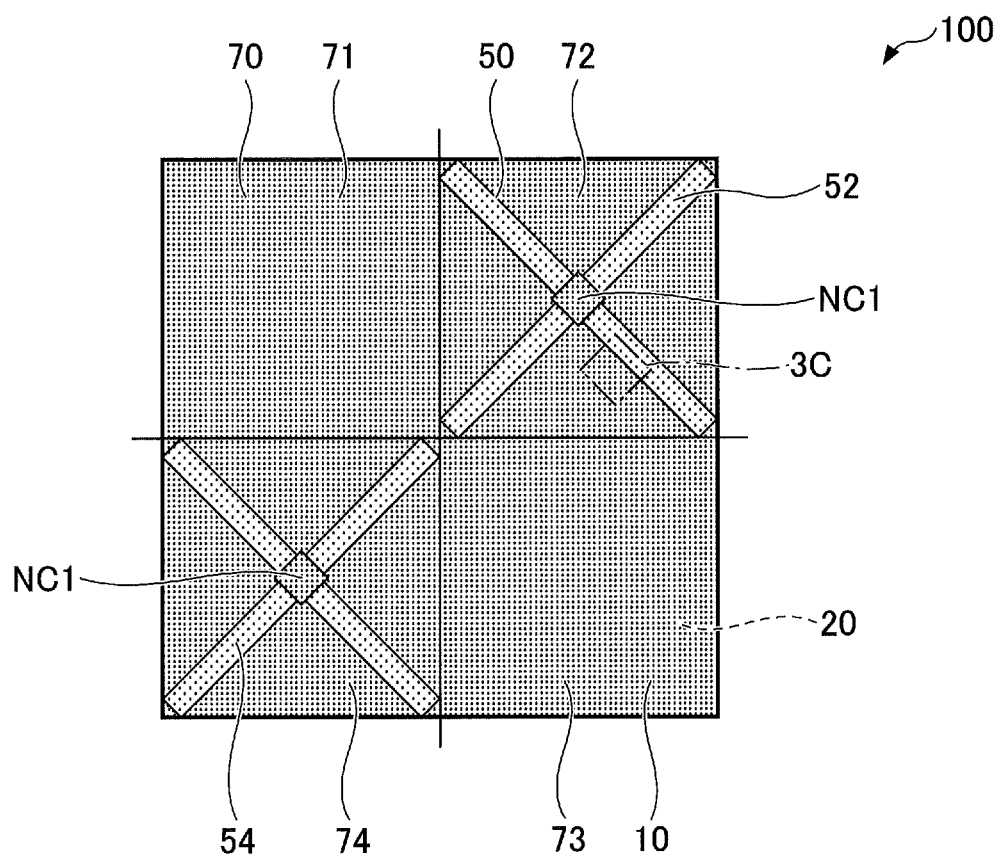
FIG. 1 illustrates a kitchen paper according to an embodiment of the present invention (first embodiment).

According to an first aspect of the present invention, there is provided a hygienic thin-leaf paper including a first sheet having front and back surfaces, on which a plurality of embossed protrusions and a plurality of embossed recesses corresponding to the plurality of embossed protrusions are respectively formed; and a second sheet having front and back surfaces, on which a plurality of embossed protrusions and a plurality of embossed recesses corresponding to the plurality of embossed protrusions are respectively formed, wherein the first sheet and the second sheet are integrated by facing the surfaces formed with the embossed protrusions in a nested form, wherein each of the first sheet and the second sheet have an embossed portion, on which the plurality of embossed protrusions and a plurality of non-embossed-protrusion portions are formed, wherein at least one of the first sheet and the second sheets have a non-embossed portion, on which the plurality of embossed protrusions and the plurality of non-embossed portions are not formed, and wherein the non-embossed portion is in a shape without having an intersection.

In this specification, the hygienic thin-leaf paper is not particularly limited and includes kitchen paper, tissue paper, dry type hygienic thin-leaf paper, and wet type hygienic thin-leaf paper impregnated with water or a chemical solution.

The hygienic thin-leaf paper may also be used for both domestic and commercial purposes.

The first sheet may employ known crepe paper for use in the hygienic thin-leaf paper. The embossed protrusion is a protrusion formed on the first sheet by embossing. The embossed recess and the embossed protrusion are simultaneously and integrally formed on the front and back surfaces of the first sheet. The non-embossed-protrusion portion is a portion of the first sheet without a protrusion and is surrounded by the multiple embossed protrusions.

The second sheet may be known crepe paper used for hygienic thin-leaf paper and the same material as the first sheet. The embossed portion is a protrusion formed on the second sheet by embossing work. The embossed protrusion and the embossed recess are simultaneously and integrally formed on the front and back surfaces of the second sheet. The non-embossed-protrusion portion is a portion of the second sheet without a protrusion and is surrounded by the multiple embossed protrusions.

In this specification, facing the surfaces formed with the embossed protrusions on the first and second sheets in a nested type means that the top of the embossed protrusion of the first sheet faces the portion of the second sheet without having the embossed protrusion (the portion, which is other than the embossed protrusion and is surrounded by the embossed protrusions, and a non-embossed-protrusion portion when viewed from the first sheet), and the top of the embossed protrusion of the second sheet faces the portion of the first sheet without having the embossed protrusion (the portion, which is other than the embossed protrusion and is surrounded by the embossed protrusions, and the non-embossed-protrusion portion when viewed from the second sheet). The top of the embossed protrusion may be bonded to the opposing non-embossed-protrusion portion.

Each of the first sheet and the second sheet have an embossed portion. The embossed portion is formed with the multiple embossed protrusions and the multiple non-embossed-protrusion portions. Said differently, each of the first sheet and the second sheet has a non-embossed portion (the multiple embossed protrusions and the multiple non-embossed-protrusion portions).

Further, at least one of the first sheet and the second sheet has the non-embossed portion. None of the multiple embossed protrusions and the multiple non-embossed-protrusion portions are formed in the non-embossed portions.

Said differently, only the first sheet has the embossed portions (neither the multiple embossed protrusions nor the multiple non-embossed-protrusion portions are formed), and only the second sheet has the non-embossed portions, and both the first sheet and the second sheet has the non-embossed portions.

In a first mode, the non-embossed portion has a shape that does not have an intersection. In this specification, a shape in which the non-embossed portions do not have an intersection means that there is no intersection within the non-embossed portions or that the non-embossed portions do not intersect each other in the first sheet and/or the second sheet.

In the first embodiment, the non-embossed portion formed on the first sheet and/or the second sheet becomes a part where oil, etc. easily passes through the hygienic thin-leaf paper. Therefore, in the hygienic thin-leaf paper in which the non-embossed portion exists, the dispersion property of the oil and so on can be exerted, and backing-off of the oil and so on, can be suppressed.

On the other hand, if the intersection exists in the non-embossed portion, oil, etc. tends to accumulate in the intersection of the non-embossed portion in the hygienic thin-leaf paper.

In the non-embossed space (hereinafter referred to as the non-embossed space) in which the non-embossed portions having such intersections are oppositely formed, a space where the non-embossed space intersects (a space where two non-embossed spaces intersect within the hygienic thin-leaf paper). In this intersecting space, the oil, etc. tends to accumulate, and it is easy to crush against the load during use.

On the other hand, in the first embodiment, because there is no such intersection in the non-embossed portion, a portion in which oil, etc. may accumulate is not formed in the hygienic thin-leaf paper.

Further, even when a non-embossed space is present in the hygienic thin-leaf paper, because the non-embossed portion of each sheet itself does not have the intersection, a space, in which the non-embossed space intersects, is not formed.

Accordingly, within the first mode, the dispersion property of the oil and so on can be improved, and the backing-off of the oil and so on, can be reduced.

Also, the non-embossed portions formed on the first sheet and/or the second sheet may be part of the hygienic thin-leaf paper which may exhibit designability.

Accordingly, in the first mode, the non-embossed portion formed on the first sheet and/or the second sheet has such designability thereon so as to maintain designability.

In the first mode, because the first sheet and the second sheet are laminated in the nested type, the contact area of the hygienic thin-leaf paper against an object to be used can be reduced. Therefore, even when the sheet is loaded during use, the space inside the hygienic thin-leaf paper is hard to collapse.

Further, because the non-embossed portion has a shape that does not have the intersection, it is possible to improve the dispersion property of the oil and so on and reduce the basis weight and paper thickness while reducing the backing-off of the oil and so on.

Therefore, according to the first mode, the thickness of the hygienic thin-leaf paper can be reduced while maintaining or improving the absorption performance required for the hygienic thin-leaf paper.

The second mode of the present invention is the hygienic thin-leaf paper, in which there is no space in which the non-embossed portions are formed opposite each other.

Here, the space in which the non-embossed portions are formed opposite each other is a space (non-embossed space) formed between the non-embossed portion of the first sheet and the non-embossed portion of the second sheet in the hygienic thin-leaf paper.

In such a structure, the non-embossed portions do not face each other between the first sheet and the second sheet. Therefore, the non-embossed space (a space Said differently formed by the non-embossed portions facing each other and is easily collapsed against the load in the thickness direction) is not formed between the first sheet and the second sheet.

Therefore, according to the second mode, the strength in the thickness direction for the load can be increased, thereby improving the absorption performance during loading (e.g., reducing the backing-off of the oil and so on.).

Further, in a structure in which the non-embossed portion disposed on the first sheet and the non-embossed portion disposed on the second sheet do not face each other, because the non-embossed portion is dispersed in the hygienic thin-leaf paper, oil dispersion, etc. easily diffuses through the non-embossed portion.

Therefore, according to the second mode, the dispersion property of the absorbed oil, etc. can be maintained even in the absence of the non-embossed space.

In the second mode, there is no non-embossed space between the first sheet and the second sheet, and therefore a space in which the non-embossed spaces intersect is not present.

Therefore, according to the second mode, from the viewpoint that a portion in which the oil is difficult to accumulate is not formed inside the hygienic thin-leaf paper, the dispersion property of the oil and so on is improved, and the backing-off of the oil and so on, can be reduced.

Also, in hygienic thin-leaf paper, because the non-embossed space becomes a part of the designability, the designability tends to decrease in the absence of the non-embossed space.

However, in a second mode, because the non-embossed portions are dispersed in hygienic thin-leaf paper, designability can be maintained even in the absence of non-embossed space.

A third mode of the present invention relates to the hygienic thin-leaf paper in which the first sheet has the non-embossed portion and the second sheet does not have the non-embossed portion. Said differently, the first sheet has both an embossed portion and a non-embossed portion.

The second sheet has an embossed portion and does not have a non-embossed portion. Said differently, only multiple embossed protrusions and multiple non-embossed protrusions are formed on the second sheet.

In a third mode, a pair of sheets is configured such that the first sheet having the embossed portion and the non-embossed portion faces the second sheet having the embossed portion and having no non-embossed portion.

In such a structure, because the non-embossed portions do not face each other between the first sheet and the second sheet, a non-embossed space (a space Said differently formed by the non-embossed portions facing each other and is easily collapsed against the load in the thickness direction) is not formed in the hygienic thin-leaf paper.

Therefore, according to the third mode, the strength of the hygienic thin-leaf paper to the load in the thickness direction can be increased, and the absorption performance at the time of applying the load can be improved (e.g., to reduce the backing-off of the oil and so on.).

Further, even in the structure where the non-embossed portions do not face each other between the first sheet and the second sheet, because the non-embossed portions are disposed in the hygienic thin-leaf paper, oil dispersion or the like can be performed in the hygienic thin-leaf paper through the non-embossed portions.

Therefore, according to the third mode, the dispersion property of the absorbed oil, etc. can be maintained even in the absence of the non-embossed space.

Further, in the structure where there is no non-embossed space between the pair of sheets, there is no space where the non-embossed space intersects (the portion where oil, etc. tends to accumulate).

Accordingly, in the third mode, the dispersion property of the oil and so on can be improved, and the backing-off of the oil and so on, can be reduced.

Also, in the hygienic thin-leaf paper, because the non-embossed space exerts designability, the designability tends to be degraded in the absence of the non-embossed space.

However, in the third mode, because the non-embossed portions formed only in the first sheet are disposed in the hygienic thin-leaf paper, designability can be maintained to be exerted even in the absence of the non-embossed space.

A fourth mode of the present invention is the hygienic thin-leaf paper, in which the first sheet and the second sheet each have two or more sheet regions. Then, at least one sheet region of the first sheet region has the non-embossed region, and only the embossed region without having the non-embossed portion is formed in the sheet regions of the second sheet.

In this specification, the sheet region means a delimited region on the sheet when each sheet is divided into arbitrary dimensions.

In this, the embossed region is a sheet region (a sheet region having only the embossed portion) that does not have the non-embossed portion from among the sheet region. The non-embossed region is a sheet region (a sheet region having the embossed portion and the non-embossed portion) that has the non-embossed portion from among the sheet regions.

Further, forming the non-embossed region in the at least one sheet region correspond to a case where the non-embossed region is formed on a partial sheet region of two or more sheet regions and the embossed region is formed in another partial sheet region, and a case where the non-embossed region is formed on all of the two or more sheet regions.

In a fourth mode, the non-embossed regions formed in at least one sheet region of the first sheet of the thus delimited sheet region will only face the embossed portions formed in the second sheet.

Said differently, each region between the first sheet and the second sheet is arranged so that the non-embossed portions do not overlap (i.e., no non-embossed space is formed).

Accordingly, in the fourth aspect, if the area of the non-embossed region formed on the first sheet is increased, the non-embossed space is present. Therefore, the strength against the load in the thickness direction can be maintained and the absorption performance during loading can be improved.

Also, even in the absence of the non-embossed space, the presence of the non-embossed regions formed in the first sheet can prevent the dispersion property such as oil dispersion from degrading and cause designability to be maintained.

A fifth mode of the present invention is the hygienic thin-leaf paper in which the non-embossed portions are formed in multiple patterns.

Here, the pattern of the non-embossed portion is the contour of the non-embossed portion formed on the first sheet, viewed from the second sheet on which the opposing embossed portion is formed. In the fifth mode, multiple non-embossed patterns can enhance the designability of hygienic thin-leaf paper.

Further, because the non-embossed region formed on the first sheet increases, the dispersion property of the oil and so on can be enhanced.

A sixth mode of the present invention relates to the hygienic thin-leaf paper, wherein two adjacent patterns of the multiple patterns are in a rotational symmetry of 360°/n (n is integers of one or more).

Here, the rotational symmetry of 360°/n means that when the pattern is rotated 360°/n around a virtual axis, the pattern after the rotation overlaps the pattern before the rotation.

In the sixth mode, the pattern of the non-embossed portion has a contour shape of the non-embossed portion formed on the sheet. The shape of the pattern is not particularly limited, and widely be circular, triangular, quadrangular, polygonal, cross, a heart, or the like.

Further, the number of graphics forming the pattern is not limited to one, and may be formed of multiple graphics, and the multiple graphics may be different.

By forming two adjacent patterns on the first sheet so as to be in such a rotationally symmetric position relation, non-embossed portions can be arranged regularly on the first sheet.

Said differently, the pattern of the non-embossed portions can exhibit a geometric pattern throughout the hygienic thin-leaf paper.

Therefore, according to the sixth mode, even in the absence of the non-embossed space, the dispersion property of the oil and so on can be prevented from degrading, and the designability can be maintained.

A seventh mode of the present invention relates to the hygienic thin-leaf paper, wherein two adjacent patterns from among the multiple patterns are point symmetric.

In this specification, the point symmetry means that when the pattern is rotated 180°, the pattern after the rotation overlaps the pattern before the rotation.

By forming two adjacent patterns on the first sheet so as to be in this positional relation of point symmetry, the non-embossed portions can be arranged regularly on the first sheet (the pattern of the non-embossed portions can exhibit a geometric pattern across the hygienic sheet).

Therefore, according to the seventh mode, the dispersion property of the oil and so on can be prevented from degrading, and the designability can be maintained.

An eighth mode of the present invention relates to the hygienic thin-leaf paper with an area ratio of the non-embossed portion of 3-16%. In this specification, the area ratio of the non-embossed portion is the ratio of the area of the non-embossed portion to the surface of the first sheet (the hygienic thin-leaf paper).

If the area ratio of the non-embossed portion is less than 3%, the dispersion property of the oil and so on may not be obtained.

Further, when the area ratio of the non-embossed portion exceeds 13%, the number of the embossed protrusions is small. Therefore it is possible that sufficient strength is not obtained for the thickness direction while applying the load.

The area ratio of the non-embossed portion formed on the first sheet is preferably 5 to 13%, and more preferably 6 to 11%.

A ninth mode of the present invention relates to the hygienic thin-leaf paper, in which the first sheet includes a first embossed portion having the multiple embossed-protrusion portions and the multiple non-embossed-protrusion portions, and a first non-embossed portion without having the multiple embossed protrusions and the multiple non-embossed-protrusion portions, and the second sheet includes a second embossed portion having the multiple embossed-protrusion portions and the multiple non-embossed-protrusion portions, and a second non-embossed portion without having the multiple embossed protrusions and multiple non-embossed-protrusion portions, wherein the first non-embossed portion faces the second embossed portion and the second non-embossed portion faces the second embossed portion, and the second non-embossed portion faces the first embossed portion.

The first sheet has a first embossed portion and a first non-embossed portion. Multiple embossed protrusions and multiple non-embossed-protrusion portions are formed in the first embossed portion. Meanwhile, neither the multiple embossed protrusions nor the multiple non-embossed-protrusion portions are formed in the first non-embossing portion.

The second sheet has a second embossed portion and a second non-embossed portion. Multiple embossed protrusions and multiple non-embossed-protrusion portions are formed in the second embossed portion. Meanwhile, neither the multiple embossed protrusions nor the multiple non-embossed-protrusion portions are formed in the second non-embossing portion.

In the ninth mode, the first embossed portion and the first non-embossed portion are formed in the first sheet so that the first non-embossed portion faces the second embossed portion and the second non-embossed portion faces the first embossed portion, and the second embossed portion and the second non-embossed portion are formed on the second sheet.

In this structure, because the non-embossed portions do not face each other between the first sheet and the second sheet, the non-embossed space (a space Said differently formed by the non-embossed portions facing each other and is easily collapsed against the load in the thickness direction) is not formed between the first sheet and the second sheet.

Accordingly, in the ninth mode, the strength in the thickness direction against the load can be increased to improve the absorption performance during loading (e.g., to reduce the backing-off of the oil and so on.).

Further, in a structure in which the non-embossed portion disposed on the first sheet and the non-embossed portion disposed on the second sheet do not face each other, because the non-embossed portion dispersedly disposed in the hygienic thin-leaf paper, oil, etc. easily diffuses through the non-embossed portion.

Therefore, according to the ninth mode, the dispersion property of the absorbed oil, etc. can be maintained even in the absence of the non-embossed space.

In the ninth mode, because there is no non-embossed space between the first sheet and the second sheet, the dispersion property of the oil and so on can be improved, and the backing-off of the oil and so on, can be reduced.

In the ninth mode, because the non-embossed portions are dispersed the in the hygienic thin-leaf paper, designability can be maintained even in the absence of non-embossed space.

A tenth mode of the present invention relates to the hygienic thin-leaf paper, wherein the first sheet and the second sheet each have two or more sheet regions, the sheet region of the first sheet being formed with a first embossed region without the first non-embossed portion and a first non-embossed region with the first non-embossed portion, and the sheet region of the second sheet being formed with a second embossed region without the second non-embossed portion and a second non-embossed region with the second non-embossed portion, so that the first non-embossed region and the second non-embossed region do not overlap.

In this specification, the sheet region means a comparted area on a sheet when each sheet is comparted to have arbitrary dimensions.

Further, the embossed region is a sheet region (the sheet region having only the embossed portion) that does not have the non-embossed portion among the sheet regions, and the non-embossed region is a sheet region (the sheet region having the embossed portion and the non-embossed portion) that has the non-embossed portion among the sheet regions.

In the tenth mode, the region having the first non-embossed region disposed on the first sheet of the thus delimited sheet region and the region having the second non-embossed portion are arranged so as not to overlap.

Said differently, even if there is the non-embossed portion in the multiple regions, the non-embossed portion does not face each other between the first sheet and the second sheet (no non-embossed space is formed).

Therefore, by increasing the area of the non-embossed portion formed in each sheet, the strength in the thickness direction to the load can be maintained, so that the absorption performance while applying the load.

Thus, in the tenth embodiment, even in the absence of the non-embossed space, the degradation in the dispersion property such as oil dispersion can be suppressed and the designability can be maintained.

An eleventh mode of the present invention relates to the hygienic thin-leaf paper, wherein the pattern of a first non-embossed portion facing a second embossed portion and the pattern of the second non-embossed portion facing the first embossed portion are rotational symmetry of $90° \times n$ (n is an odd number).

In this specification, the pattern of the non-embossed portion has a shape of the contour of the non-embossed portion formed in the other sheet viewed from one sheet on which the opposing embossed portion is formed.

Also, the rotational symmetry of $90° \times n$ means that when the pattern is rotated by $90° \times n$ around a virtual axis, the pattern after the rotation overlaps the pattern before the rotation.

The shape of the pattern is not particularly limited, and any shape, such as a circle, a triangle, a quadrangle, a polygon, a cross, a heart, or the like, can be employed.

Further, the number of graphics constituting the pattern is not limited to one, and may be formed of multiple graphics, and the multiple graphics may have different shapes.

By forming the non-embossed portions having the patterns of rotationally symmetric positional relation respectively on the first sheet and the second sheet, the non-embossed portions may be arranged regularly between the first sheet and the second sheet (the non-embossed patterns may exhibit geometric patterns throughout the hygienic thin-leaf paper).

Therefore, within the eleventh mode, even in the absence of the non-embossed space, degradation of the dispersion property of the oil dispersion can further be suppressed and the designability can be maintained.

The twelfth mode of the present invention relates to the hygienic thin-leaf paper, wherein the pattern of the first non-embossed portion facing the second embossed portion and the pattern of the second non-embossed portion facing the first embossed portion are linearly symmetrical.

In this specification, the linear symmetry means that the pattern after inversion overlaps with the pattern before inversion when the pattern is inverted using a virtual straight line as an axis.

The non-embossed portions may be arranged regularly between the first sheet and the second sheet by forming, respectively, the non-embossed portions having a pattern that results in such a linear symmetric positional relation into the first sheet and the second sheet.

Therefore, within the twelfth mode, the degradation in the dispersion property of the oil can further be suppressed, and the designability can be maintained.

A thirteenth mode of the present invention relates to the hygienic thin-leaf paper, wherein the area ratio of the first non-embossed portion and the second non-embossed portion is 3-16%.

In this specification, the area ratio of the non-embossed portion is the ratio of the area of the non-embossed portion to the sheet surface on which the non-embossed portion is formed.

If the area ratio of the non-embossed portion is less than 3%, the dispersion property such as sufficient oil dispersion property may not be obtained.

Further, when the area ratio of the non-embossed portion exceeds 13%, the number of the embossed protrusions is too small to obtain sufficient strength in the thickness direction while applying the load.

The area ratio of the non-embossed portion formed in each sheet is preferably 5% to 13%, and more preferably 6% to 11%.

Hereinafter, embodiments of the present invention will be described in detail with reference to the drawings.

In order to facilitate understanding, the scale of each member in each figure may be different from that in practice.

Further, the descriptions of parts common to each drawing may be omitted only by attaching the same reference numerals.

FIG. 1 illustrates a kitchen paper according to an embodiment of the present invention (first embodiment), and FIGS. 2(A) and (B) illustrate crepe paper forming the kitchen paper of FIG. 1.

Figure 2:
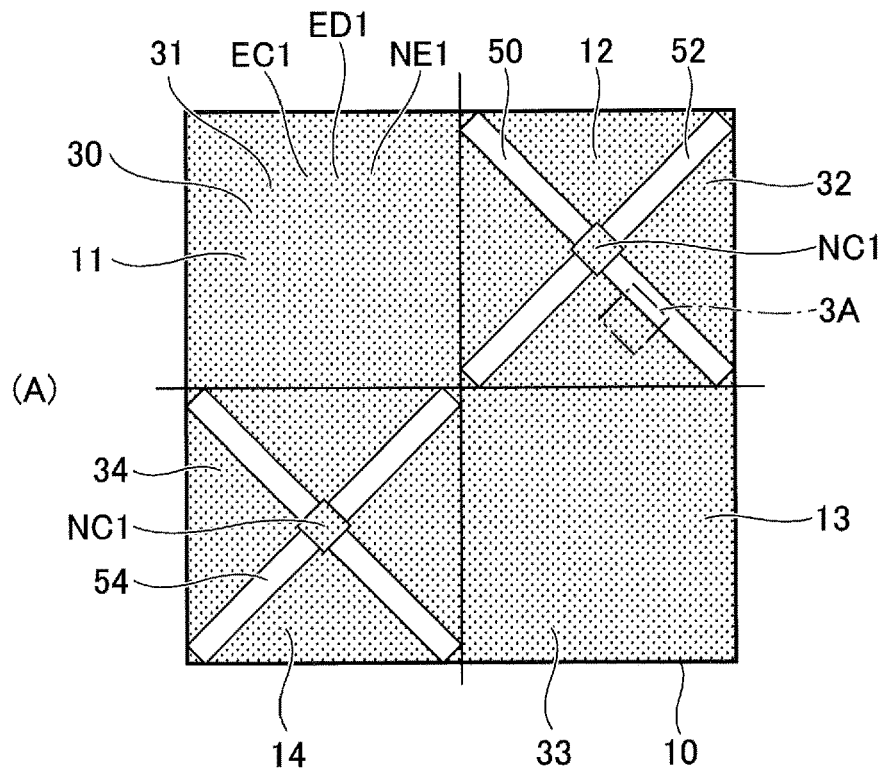
FIGS. 2(A) and 2(B) illustrate a crepe paper that constitutes the kitchen paper of FIG. 1.
Figure 2:
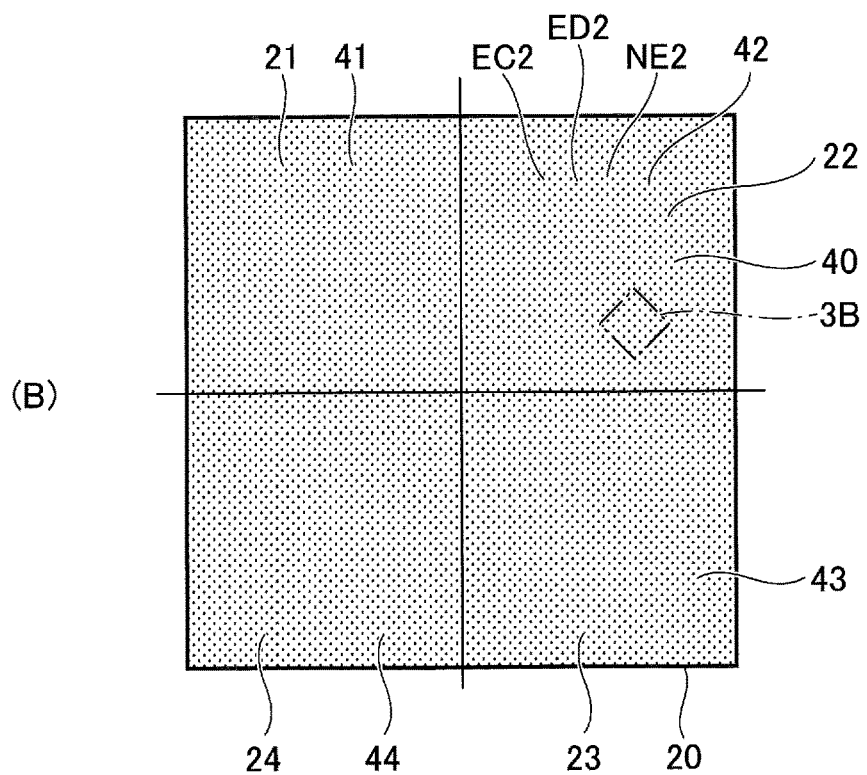

As illustrated in FIGS. 1 and 2, the kitchen paper 100 includes crepe paper 10 and crepe paper 20.

The embodiments of the kitchen paper 100 are not particularly limited. For example, a roll type wrapping a strip of kitchen paper having the line of perforations at appropriate intervals around a paper tube, or by lamination-type laminated sheets of sheet-fed kitchen paper termed pick-up, pop-up, or the like.

The kitchen paper 100 is an example of the hygienic thin-leaf paper of the present invention, and crepe paper 10, 20 is an example of the first and second sheet constituting a hygienic thin-leaf paper of the present invention.

The crepe paper 10 is made of paper made mainly from pulp as the raw material.

Pulp compositions may use known compositions in kitchen paper.

For example, the percentage of pulp may be 50% by mass or more, preferably 90% by mass or more, and more preferably 100% by mass.

The crepe paper 20 may also be made of a paper similar to that of the crepe paper 10.

Pulp compositions can be used in suitable proportions, for example, with coniferous pulp such as NBKP (coniferous kraft pulp) or NUKP (unbleached pulp) and hardwood pulp such as LBKP (hardwood kraft pulp) or LUKP (unbleached pulp).

In particular, it is preferable that the coniferous pulp be a pulp composition with a higher composition than the hardwood pulp. Preferably, the ratio of coniferous pulp to hardwood pulp is between 50:50 and 80:20.

For crepe paper 10 and 20, paper with a basis weight of 15-30 $g/m^2$ is used based on JIS P 8124 (1998). Adjusting the basis weight of crepe paper 10 and 20 to this range provides sufficient liquid diffusion when a liquid such as water or oil touches the paper surface, resulting in particularly high water absorption performance. Further, the basis weight within this range provides flexibility and traceability in use as kitchen paper.

Here, the kitchen paper according to the present embodiment (the first embodiment) will be described in more detail.

FIG. 3(A) is an enlarged view of the portion surrounded by the 3A line of FIG. 2(A), FIG. 3(B) is an enlarged view of the portion surrounded by the 3B line of FIG. 2(B), and FIG. 3(C) is an enlarged view of the portion surrounded by the 3C line of FIG. 1.

FIG. 4(A) is a cross-sectional view of a 4A-4A line of FIG. 3(A), FIG. 4(B) is a cross-sectional view of a 4B-4B line of FIG. 3(B), and FIG. 4(C) is a cross-sectional view of a 4C-4C line of FIG. 3(C).

Figure 3:
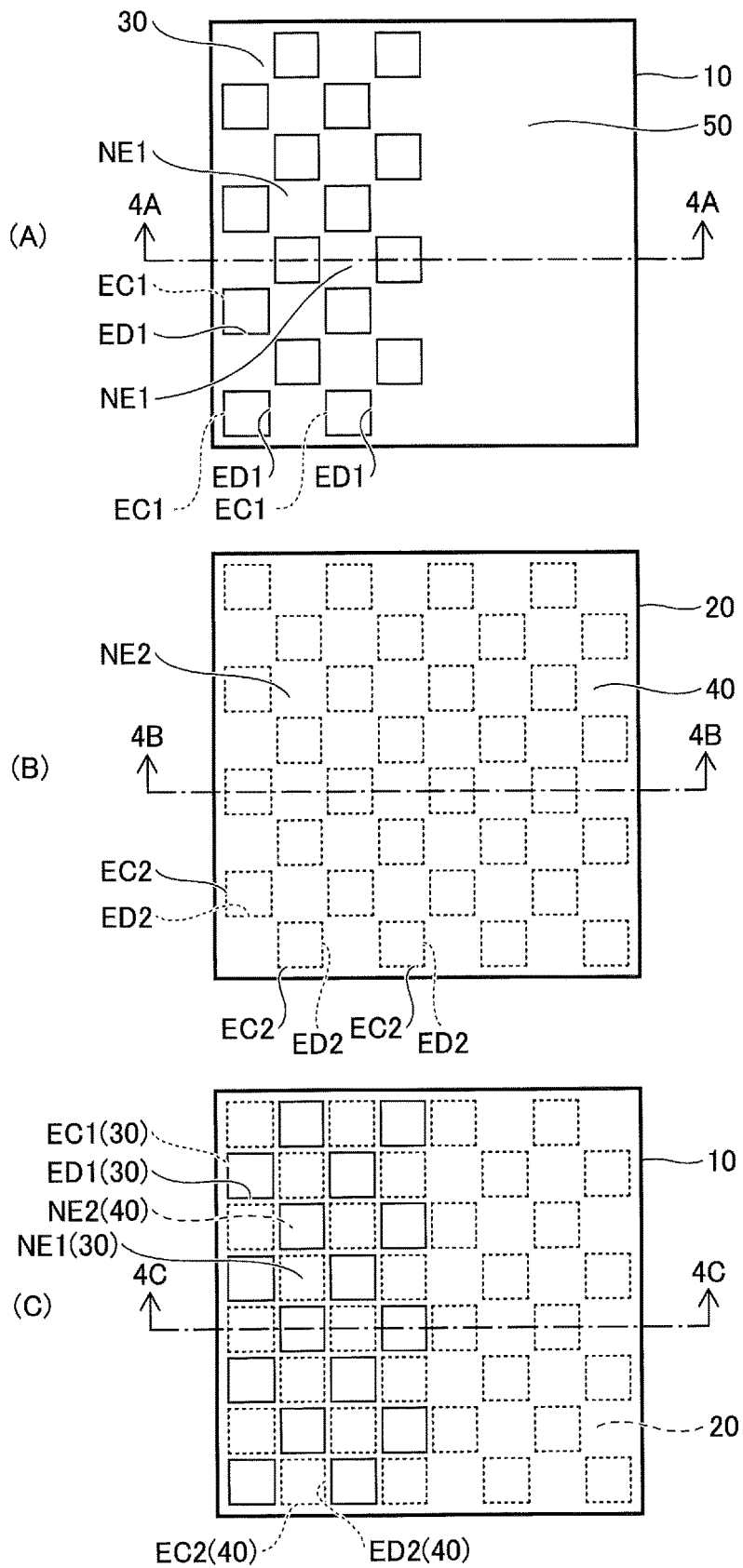
FIG. 3(A) is an enlarged view of a portion of FIG. 2(A) surrounded by a line 3A.
FIG. 3(B) is an enlarged view of a portion of FIG. 2(B) surrounded by a line 3B.
FIG. 3(C) is an enlarged view of a portion of FIG. 1 surrounded by a line 3C.

In the crepe paper 10, multiple embossed recesses ED1 corresponding to the embossed protrusion EC1 and the embossed protrusion EC1 are formed on the front and rear surfaces of the crepe paper 10 (see FIG. 3).

The top of each embossed protrusion EC1 (or an opening of the embossed recess ED1) has a quadrangle shape in its plane view (see FIG. 3).

The side surfaces of the embossed protrusion EC1 (or embossed recess ED1) are tapered from the bottom of the embossed recess ED1 toward the opening.

The embossed protrusion EC1 is formed on one side of the crepe paper 10 by pressing a protruding emboss roll, not illustrated, against the crepe paper 10 by a known steel rubber embossing method.

Figure 4:
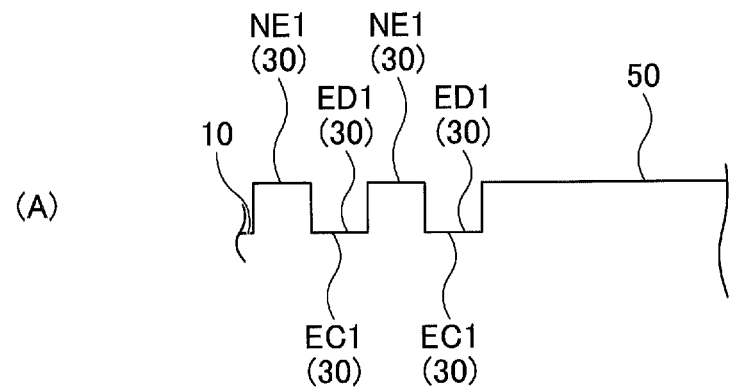
FIG. 4(A) is a cross-sectional view of FIG. 3(A) taken along a line 4A-4A.
FIG. 4(B) is a cross-sectional view of FIG. 3(B) taken along a line 4B-4B.
FIG. 4(C) is a cross-sectional view of FIG. 3(C) taken along a line 4C-4C.
Figure 4:
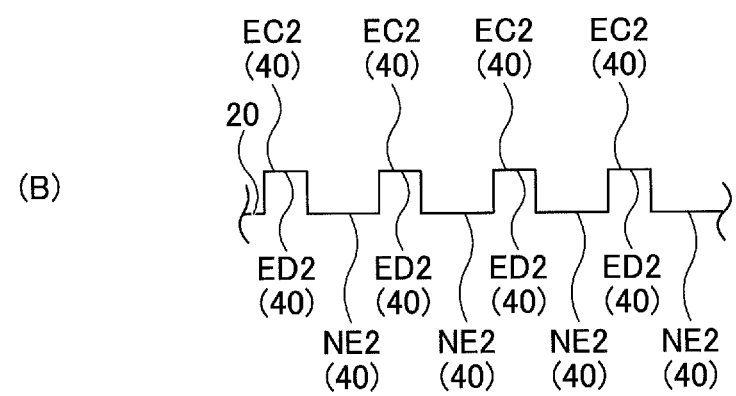
Figure 4:
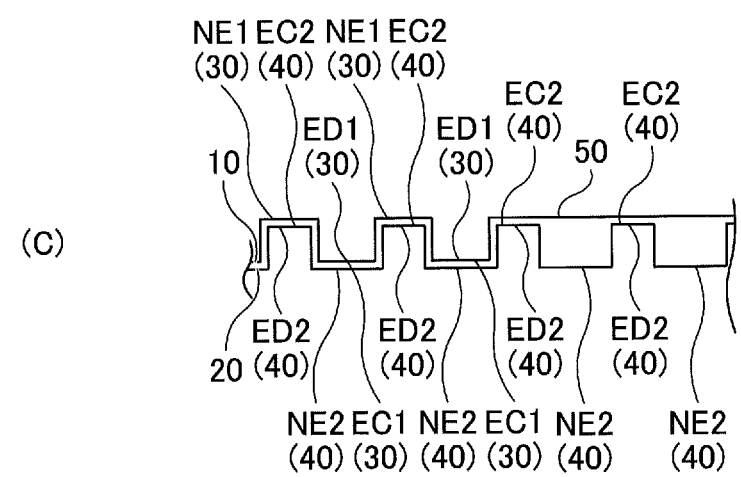

On the other hand, the embossed recess ED1 is formed on the other side of the crepe paper 10 as an embossed portion corresponding to the embossed protrusion EC1 (see FIG. 3 and FIG. 4).

The crepe paper 10 has an embossed portion 30 and a non-embossed portion 50. The multiple embossed protrusions EC1 and the multiple non-embossed-protrusion portions NE1 are formed in the embossed portion 30. Meanwhile, neither the multiple embossed protrusion EC1 nor the multiple non-embossed-protrusion portion NE1 are formed in the non-embossed portion 50 (see FIGS. 2 to 4).

Here, the non-embossed-protrusion portion NE1 is a portion in which a protrusion surrounded by multiple embossed protrusions EC1 is not formed (see FIG. 3 and FIG. 4).

The embossed portion 30 and the non-embossed portion 50 are examples of the embossed portion 30 and the non-embossed portion 50 formed on the first sheet constituting the hygienic thin-leaf paper of the present invention.

In the crepe paper 20, the embossed protrusion EC2 and the embossed recess ED2 corresponding to the embossed protrusion EC2 are formed on the front and rear surfaces of the crepe paper 20 (see FIG. 3).

The top of each embossed protrusion EC2 (or the opening of the embossed recess ED2) has a quadrangle shape in its plane view (see FIG. 3).

The side surfaces of the embossed protrusion EC2 (or the embossed recess ED2) has a tapered portion (not illustrated) which is tapered from the bottom of the embossed recess ED2 toward the opening.

The embossed protrusion EC2 is formed on one surface of the crepe paper 20 by pressing a protruding emboss roll (not illustrated) against the crepe paper 20 in a manner similar to the crepe paper 10.

On the other hand, the embossed recess ED2 is formed on the other surface of the crepe paper 20 as an embossed recess corresponding to the embossed protrusion EC2 (see FIG. 3 and FIG. 4).

The crepe paper 20 has the embossed portion 40 and does not have a non-embossed portion.

The embossed protrusions EC2 and multiple non-embossed-protrusion portions NE2 are formed in the embossed portion 40.

Said differently, only the multiple embossed protrusions EC2 and non-embossed-protrusion portion NE2 are formed on the crepe paper 20 (see FIGS. 2 to 4).

Here, the non-embossed-protrusion portion NE2 is a portion surrounded by the multiple embossed protrusions EC2 and has no protrusion (see FIG. 3 and FIG. 4).

The embossed portion 40 is an example of an embossed portion and a non-embossed portion formed on a second sheet of hygienic thin-leaf paper according to the present invention.

In the kitchen paper 100 of the first embodiment, the crepe paper 10 and the crepe paper 20 are overlaid, and the forming surfaces of the embossed protrusions EC1 and EC2 face each other in a nested fashion to form an integral part.

Specifically, the embossed protrusion EC1 of the crepe paper 10 is disposed opposite to the non-embossed-protrusion portion NE2 of the crepe paper 20 (a portion in which the embossed protrusion EC2 is not disposed).

On the other hand, the embossed protrusion EC2 of the crepe paper 20 is disposed opposite to the non-embossed-protrusion is not provided) of the crepe paper 10 (see FIGS. 1 to 4).

The top portion of the embossed protrusion EC1 of the crepe paper 10 is bonded to the non-embossed-protrusion portion NE2 of the crepe paper 20 by an adhesive (see FIG. 4) not illustrated.

By bonding the top of the embossed protrusion EC1 of the crepe paper 10 to the non-embossed-protrusion portion NE2 of the crepe paper 20, the adhesive portions of the two crepe papers 10 and 20 can be balanced on one crepe paper (crepe paper 10) side.

Accordingly, it is possible to reduce the deterioration of the absorption performance due to the adhesive.

The adhesive may be a known adhesive employed in a kitchen paper having a laminated structure.

Such adhesives include, for example, cellulosic adhesives such as polyvinyl alcohol, starch, modified starch, carboxymethylcellulose, and the like.

Instead of bonding the top of the embossed protrusion EC1 of the crepe paper 10 to the non-embossed-protrusion portion NE2 of the crepe paper 20, the top of the embossed protrusion EC2 of the crepe paper 20 and the non-embossed-protrusion portion NE1 of the crepe paper 10 may be bonded.

Further, the top portion of the embossed protrusion EC1 of the crepe paper 10 may be bonded to the non-embossed-protrusion portion NE2 of the crepe paper 20, and the top of the embossed protrusion EC2 of the crepe paper 20 may be bonded to the non-embossed-protrusion portion NE1 of the crepe paper 10.

In the first embodiment, as illustrated in FIGS. 1 and 2, the non-embossed portion 50 of the crepe paper 10 has a shape that does not have an intersection.

Said differently, there is no intersection between the non-embossed portions in the non-embossed portions 50 of the crepe paper 10.

For example, in the first embodiment illustrated in FIGS. 1 and 2, the embossed protrusion NC1 is formed in a portion that may be an intersection of the non-embossed portion 50 of the crepe paper 10.

In the first embodiment, because there is no intersection in the non-embossed portion 50 where oil and so on may probably remain in the non-embossed portion 50, the dispersion of the oil and so on can be improved, and the backing-off of the oil and so on can be reduced.

The shape in which the non-embossed portion 50 of the crepe paper 10 does not have an intersection is an example of a shape in which the non-embossed portion of the present invention does not have the intersection.

In the first embodiment, as illustrated in FIGS. 1 to 4, the embossed portion 30 and the non-embossed portion 50 of the crepe paper 10 are formed in the crepe paper 10 so that the embossed portion 30 and the non-embossed portion 50 of the crepe paper 10 face the embossed portion 40 of the crepe paper 20, and only the embossed portion 40 is formed in the crepe paper 20.

By employing such a structure, in the first embodiment, because the non-embossed portions do not face each other between the crepe paper 10 and the crepe paper 20, there is no non-embossed space Said differently easily collapsed between the crepe paper 10 and the crepe paper 20.

According to the first embodiment, because the thickness direction strength of the kitchen paper 100 can be increased for the load, the absorption performance while applying the load can be improved (e.g., the backing-off of the oil and so on. of the kitchen paper 100 can be reduced) (see FIGS. 1-4).

Further, even if the structure is such that the non-embossed portions do not face each other between the crepe paper 10 and the crepe paper 20, because the non-embossed portions 50 are disposed in the kitchen paper 100, oil and the like can easily diffuse through the non-embossed portions 50 in the kitchen paper 100 (see FIGS. 1 to 4).

Therefore, according to the first embodiment, the dispersion property of the absorbed oil, etc. can be maintained without forming the non-embossed space.

Further, as illustrated in FIG. 1, in the first embodiment, in the structure where the non-embossed portions do not face each other between the crepe paper 10 and the crepe paper 20, a non-embossed space is not formed between the crepe paper 10 and the crepe paper 20 (see FIG. 4).

Accordingly, in the first embodiment illustrated in FIG. 1, there is naturally no space where the non-embossed space intersects (a portion where oil, etc. tends to accumulate) (see FIG. 1).

Therefore, within the first embodiment, from the viewpoint of preventing oil, etc. from remaining in the space where the non-embossed space intersects, the dispersion property of the oil and so on can be improved, and the backing-off of the oil and so on, can be reduced.

Incidentally, as illustrated in FIG. 1, a structure in which the non-embossed portions do not face each other (no non-embossed space is formed) between the crepe paper 10 and the crepe paper 20 is an example of a structure in which the non-embossed portions of the present invention are formed in opposite spaces.

In the first embodiment, as illustrated in FIG. 1, because the non-embossed portion 50 is disposed in the kitchen paper 100, designability can be maintained without forming a non-embossed space (see FIG. 1).

Further, in the first embodiment, a nested laminated structure is employed, so that the area of contact with the object to be used (e.g., tableware, fried goods) of the kitchen paper 100 can be reduced, and the space in the kitchen paper 100 is difficult to collapse even when the kitchen paper is loaded during use.

Furthermore, even if a non-embossing space is not provided between the crepe paper 10 and the crepe paper 20, the dispersion of the oil and so on can be improved and the absorption performance at the time of loading can be improved (see FIGS. 1 to 4).

Therefore, within the first embodiment, while improving the absorption performance during loading, the weight of the crepe paper 10 and 20 and the paper thickness can be reduced, and the thickness of the kitchen paper 100 can be reduced.

In the first embodiment, the kitchen paper 100 has more than one region, and the crepe paper 10 and 20 forming the kitchen paper 100 each have more than two regions (sheet regions).

As illustrated in FIG. 2(A), the sheet region of the crepe paper 10 (the first sheet region 11, the second sheet region 12, the third sheet region 13, and the fourth sheet region 14) of the crepe paper 10 is formed with a region having no non-embossed portion 50 and a region having the non-embossed portion 50.

On the other hand, as illustrated in FIG. 2(B), only a region without the non-embossed portion is formed on the sheet region of the crepe paper 20 (a fifth sheet region 21, a sixth sheet region 22, a seventh sheet region 23, and an eighth sheet region 24).

Said differently, the region having the non-embossed portion 50 is arranged to overlap the region without the non-embossed portion.

Specifically, as illustrated in FIG. 1, the kitchen paper 100 includes a region 70 that can be divided into four regions.

This region 70 can be divided into a first region 71 to a fourth region 74.

In the region 70, the embossed portion 30 of the crepe paper 10 and the embossed portion 40 of the crepe paper 20 are respectively disposed in the first region 71 and the third region 73, and the non-embossed portion 50 of the crepe paper 10 and the embossed portion 40 of the crepe paper 20 are respectively disposed in the second region 72 and the fourth region 74.

Within the first embodiment, as illustrated in FIG. 2(A), the embossed portion 30 of the crepe paper 10 is divided into the first embossed region 31 to the fourth embossed region 34, and the non-embossed portion 50 of the crepe paper 10 is divided into the second non-embossed region 52 and the fourth non-embossed region 54.

Further, as illustrated in FIG. 2(B), the embossed portion 40 of the crepe paper 20 is divided into the first embossed region 41 to the fourth embossed region 44.

Then, in the first region 71 of the four regions of the kitchen paper 100, the first embossed region 31 of the crepe paper 10 and the first embossed region 41 of the crepe paper 20 face each other.

In the second region 72, the second non-embossed region 52 of the crepe paper 10 and the second embossed region 42 of the crepe paper 20 face each other.

Further, in the third region 73, the third embossed region 33 of the crepe paper 10 and the third embossed region 43 of the crepe paper 20 face each other.

In the fourth region 74, the fourth non-embossed region 54 of the crepe paper 10 and the fourth embossed region 44 of the crepe paper 20 face each other (see FIGS. 1 to 4).

In the first embodiment, in the kitchen paper 100, the non-embossed portion 50 of the crepe paper 10 is disposed in the second and fourth regions 72, 74, but the non-embossed portion is not formed on the crepe paper 20.

In such a structure, the non-embossed regions 52, 54 of the non-embossed portion 50 disposed in two of the four regions of the kitchen paper 100 do not face each other between the crepe paper 10 and the crepe paper 20.

Therefore, the non-embossed space (a collapsible space) is not formed in which the non-embossed portions face each other (see FIGS. 1 to 4).

Accordingly, in the first embodiment, the area of a non-embossed region of the non-embossed portion 50 formed on the crepe paper 10 can be increased, and the strength in the thickness direction for the load can be increased. Therefore, the absorption performance during loading can be improved.

Further, even if the area of a non-embossed region of the non-embossed portion 50 formed on the crepe paper 10 is increased, because there is not the non-embossed space, the dispersion property is prevented from being degraded, and the designability is maintained while maintaining the absorption performance high during loading (see FIGS. 1 to 4).

Within the first embodiment, as illustrated in FIGS. 1 and 2, the non-embossed portions 50 of the crepe paper 10 are formed in multiple patterns.

The pattern of the non-embossed portion 50 is in the shape of the non-embossed portion 50 formed on the crepe paper 10 viewed from the crepe paper 20 on which the opposing embossed portion 40 is formed.

Specifically, one pattern is formed on the non-embossed region 52 of the crepe paper 10 and another pattern is formed on the non-embossed region 54 of the crepe paper 10.

Within the first embodiment, the pattern of the non-embossed portion 50 can be made multiple in this manner so as to enhance the designability of the hygienic thin-leaf paper.

Further, because the non-embossed region formed on the first sheet increases, the dispersion property of the oil and so on can be enhanced (see FIG. 1).

Within this embodiment, the pattern of the multiple non-embossed-protrusion portions 50 formed on the crepe paper 10 is in a rotational symmetry of 360°/n.

Here, n is integers of one or more.

Specifically, in the first embodiment illustrated in FIGS. 1 and 2, the pattern formed in the non-embossed region 52 and the pattern formed in the non-embossed region 54 is in a rotational symmetry of 180°.

The shape of the pattern of the non-embossed portion is arbitrary.

In the first embodiment, as illustrated in FIGS. 1 and 2, the shape of the pattern is a cross.

By forming the non-embossed portion 50 on the crepe paper 10 having a pattern that causes such a rotationally symmetric positional relation, the non-embossed portion 50 can be arranged regularly between the crepe paper 10 and the crepe paper 20.

Said differently, as illustrated in FIG. 1, the pattern of the non-embossed portion 50 can exhibit a geometric pattern when viewed throughout the kitchen paper 100.

Accordingly, within the first embodiment, the dispersion property of the oil and so on can be suppressed from being degraded, and the designability can be maintained.

From a different point of view, within the first embodiment, as illustrated in FIG. 1, the pattern of the multiple non-embossed portions 50 formed on the crepe paper 10 is point symmetrical.

Specifically, as illustrated in FIGS. 1 and 2, the pattern formed in the non-embossed region 52 and the pattern formed in the non-embossed region 54 are point symmetrical.

The non-embossed portion 50 having a pattern that causes such a point-symmetric positional relation can also be formed on the crepe paper 10, and the non-embossed portions 50 can be arranged regularly between the crepe paper 10 and the crepe paper 20 without forming a non-embossed space (see FIGS. 1 and 2).

Therefore, within the first embodiment of FIG. 1, the degradation in the dispersion property, such as oil dispersion, can be further suppressed, and the designability can be maintained.

Further, in the kitchen paper 100 illustrated in FIG. 1, the area ratio of the non-embossed portion 50 of the crepe paper 10 (the ratio of the area of the non-embossed portion to the sheet surface on which the non-embossed portion is formed) is 3 to 16%, preferably 5 to 13%, and more preferably 6 to 11%.

If the area ratio of the non-embossed portion 50 is less than 3%, the dispersion property of the oil, etc. may not be obtained.

Further, when the area ratio of the non-embossed portion 50 exceeds 13%, the number of the embossed portion is small, and it is possible that sufficient strength may not obtained for the thickness direction while applying the load.

Figure 5:
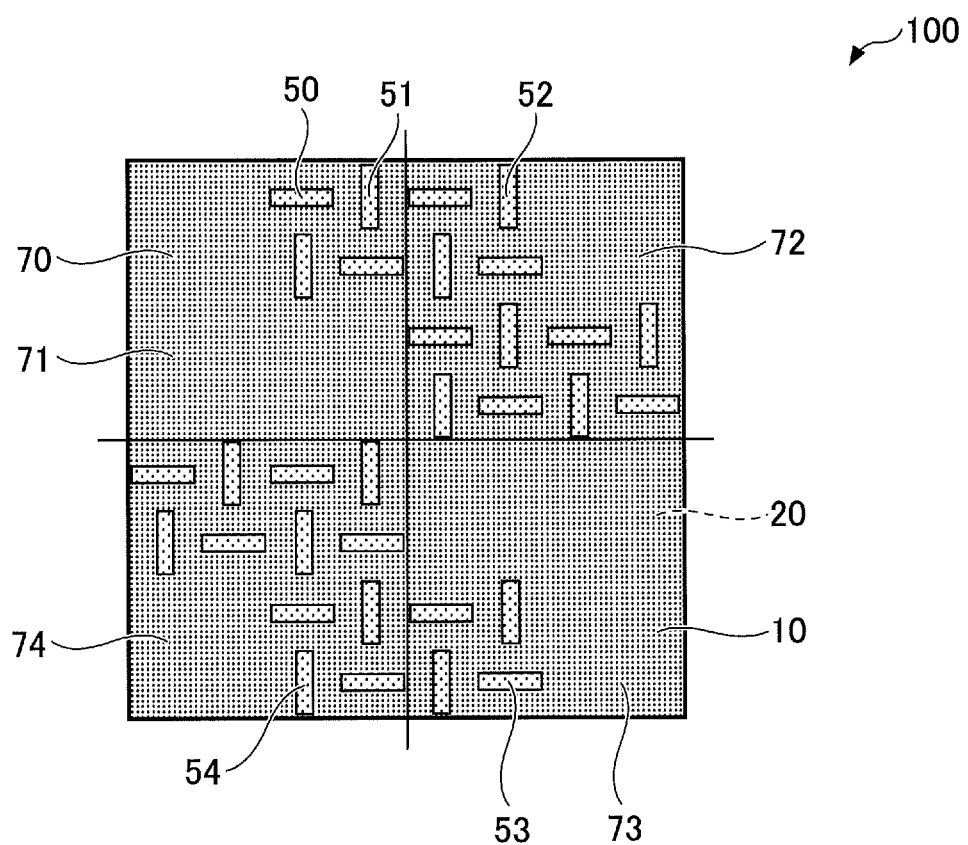
FIG. 5 illustrates a kitchen paper according to the embodiment of the present invention (second embodiment).

FIG. 5 illustrates the kitchen paper according to the embodiment (second embodiment) of the present invention, and FIGS. 6(A) and (B) illustrate the crepe paper that constitutes the kitchen paper of FIG. 5.

Within the second embodiment illustrated in FIG. 5, because the pattern of the non-embossed portions is multiple independent rectangular patterns, the non-embossed portions do not intersect each other.

In the second embodiment illustrated in FIG. 5, because there is no intersection in the non-embossed portions 50 where there is a possibility that oil and so on may remain in the non-embossed portions 50, the dispersion property of the oil and so on can be further improved, and the backing-off of the oil and so on can be further reduced.

Figure 6:
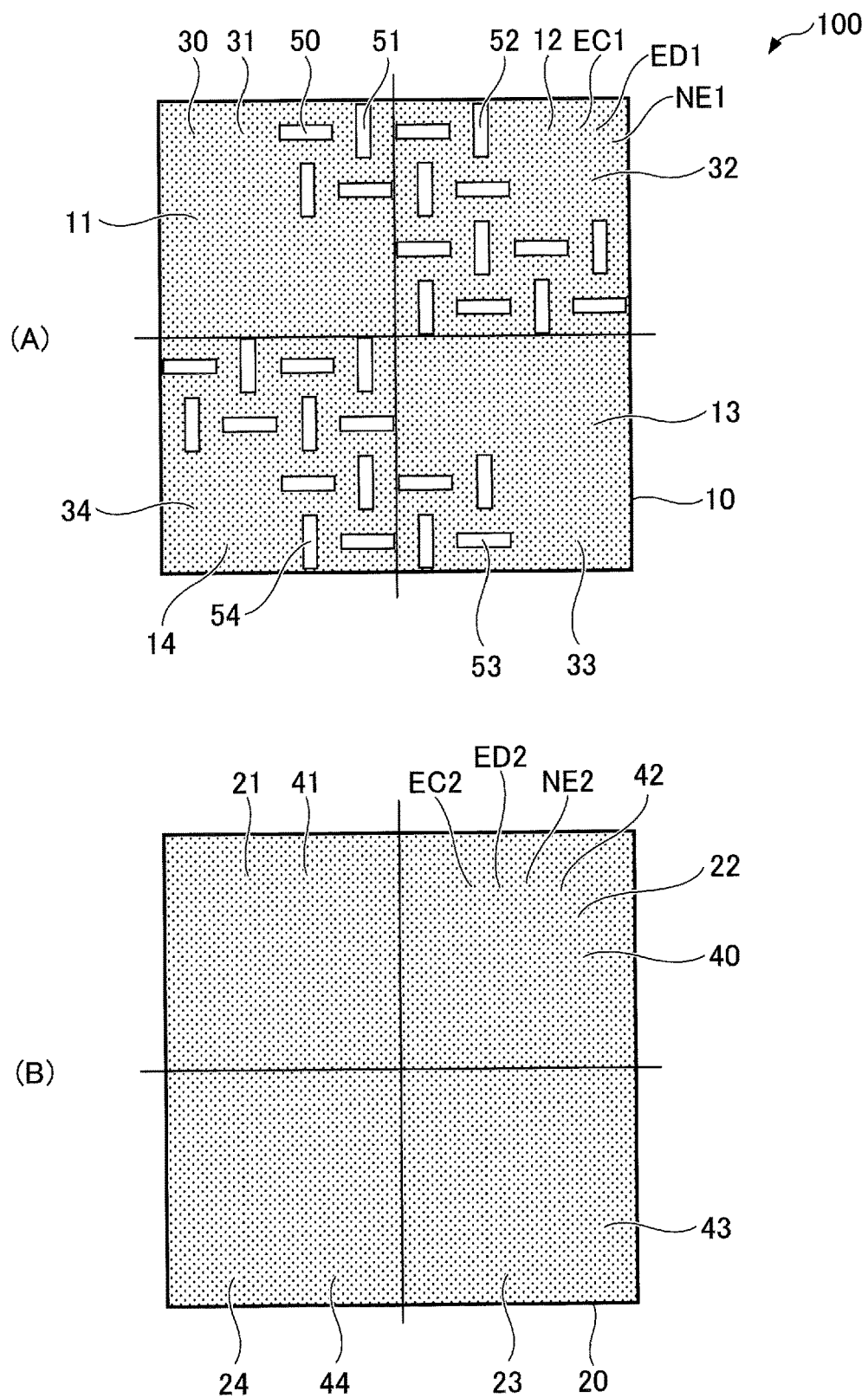
FIGS. 6(A) and 6(B) illustrate a crepe paper that constitute the kitchen paper of FIG. 5

In the second embodiment illustrated in FIGS. 5 and 6, the pattern of the multiple non-embossed portions 50 formed on the crepe paper 10 is 360°/n rotational symmetry (n is an integer of one or more).

Specifically, the pattern formed in the non-embossed regions 51, 52 and the pattern formed in the non-embossed regions 53, 54 are in a rotational symmetry of 180°.

Within the second embodiment, as illustrated in FIG. 5, in each non-embossed region 51 to 54 has the pattern shape of a rectangular.

Further, within the second embodiment of FIG. 5, four patterns are formed in the non-embossed regions 51 and 53, and 12 patterns are formed in the non-embossed regions 52 and 54.

In the second embodiment illustrated in FIGS. 5 and 6, a non-embossed portion 50 having a pattern that causes such a rotationally symmetric positional relation can be formed on the crepe paper 10 so that the non-embossed portion 50 can be arranged regularly between the crepe paper 10 and the crepe paper 20.

Said differently, as illustrated in FIG. 5, the pattern of the non-embossed portion 50 can exhibit a geometric pattern when viewing the entire kitchen paper 100.

Accordingly, within the second embodiment illustrated in FIG. 5, it is possible to reduce the dispersion property of the oil and so on an be suppressed from degrading without providing the non-embossed space, and the designability may be maintained.

From a different point of view, within the second embodiment illustrated in FIGS. 5 and 6, the pattern formed in the non-embossed regions 51 and 52 and the pattern formed in the non-embossed regions 53 and 54 are in the point symmetrical.

By forming the non-embossed portion 50 on the crepe paper 10 with a pattern that causes such a point-symmetric positional relation, the non-embossed portions 50 can be arranged regularly between the crepe paper 10 and the crepe paper 20 without forming a non-embossed space.

Therefore, even in the second embodiment illustrated in FIG. 5, the dispersion property of the oil and so on can be suppressed from degrading, and the designability can be maintained.

Figure 7:
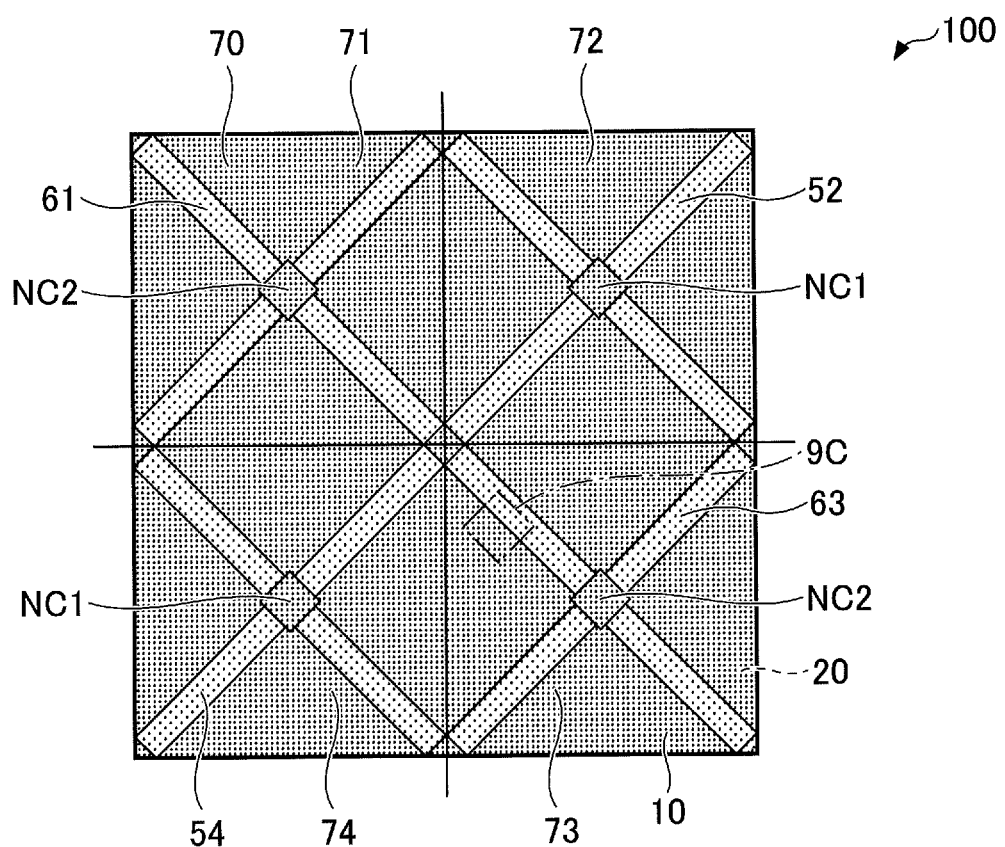
FIG. 7 illustrates a kitchen paper according to the embodiment (third embodiment).

FIG. 7 illustrates a kitchen paper according to the embodiment of the present invention (the third embodiment), and FIGS. 8(A) and (B) illustrate the crepe paper that forms the kitchen paper of FIG. 7.

FIG. 9(A) is an enlarged view of a portion surrounded by a line 9A in FIG. 8(A), FIG. 9(B) is an enlarged view of a portion surrounded by a line 9B in FIG. 8(B), and FIG. 9(C) is an enlarged view of a portion surrounded by a line 9C in FIG. 7.

Further, FIG. 10A is a cross-sectional view of FIG. 9A taken along a line 10A-10A, FIG. 10B is a cross-sectional view of FIG. 9B taken along a line 10B-10B, and FIG. 10O is a cross-sectional view of FIG. 9C taken along a line 10C-10C.

Figure 8:
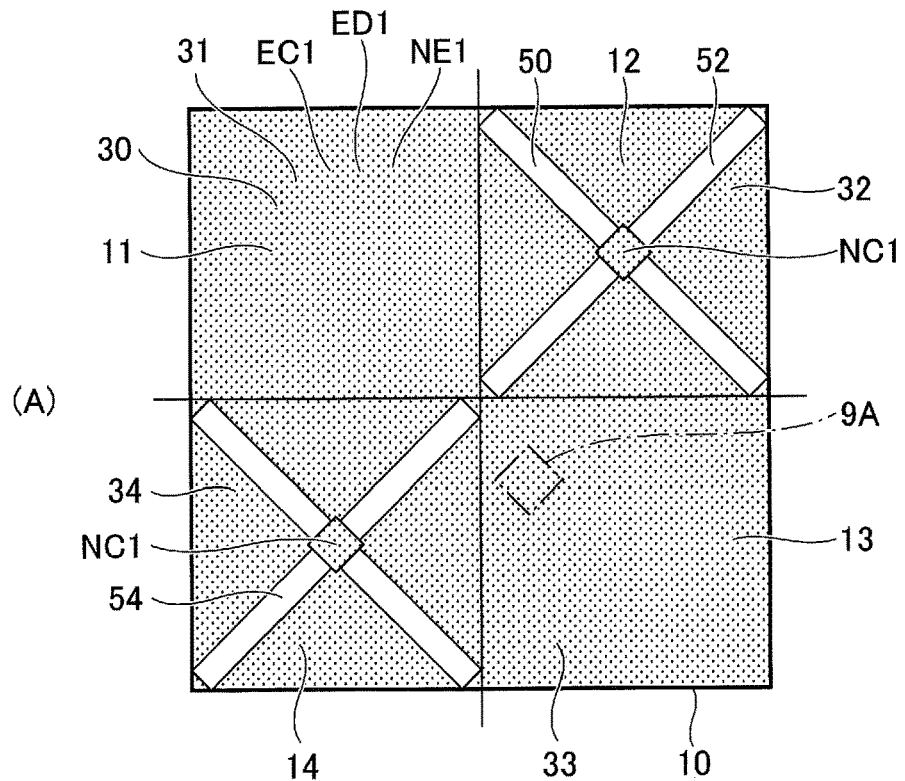
FIGS. 8(A) and 8(B) illustrate a crepe paper that constitutes the kitchen paper of FIG. 7.
Figure 8:
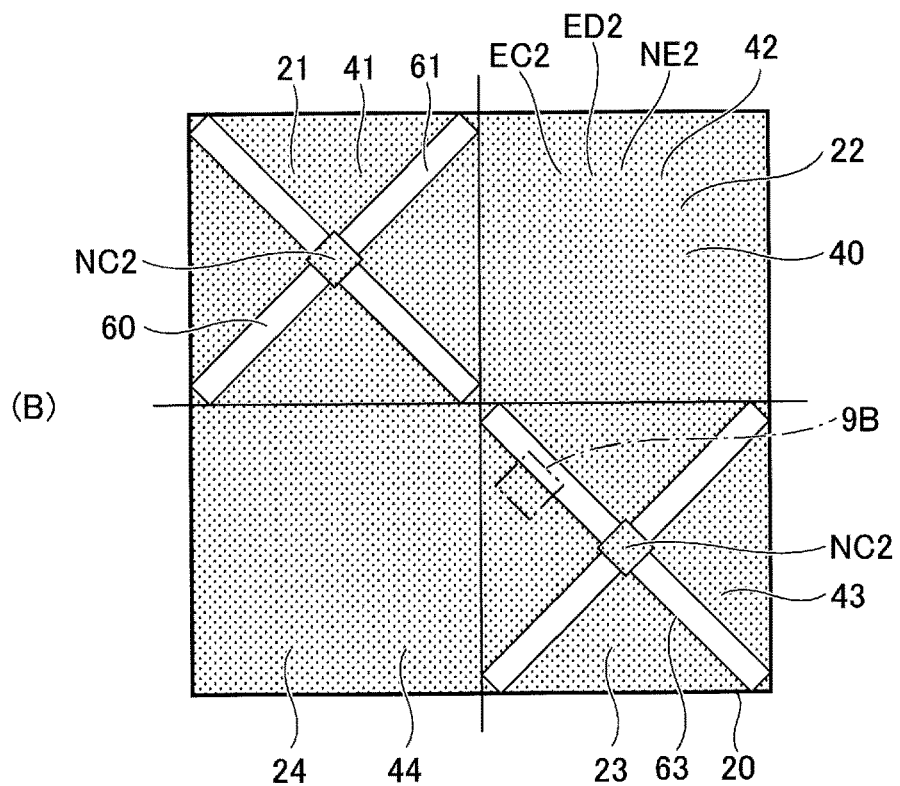

In the kitchen paper 100 illustrated in FIGS. 7 and 8, the crepe paper 10 has the embossed portion 30 and the non-embossed portion 50. The multiple embossed protrusions EC1 and the multiple non-embossed-protrusion portions NE1 are formed in the embossed portion 30. Meanwhile, neither the multiple embossed protrusions EC1 nor the multiple non-embossed-protrusion portions NE1 are formed in the non-embossed portion 50 (see FIGS. 8 to 10).

Figure 9:
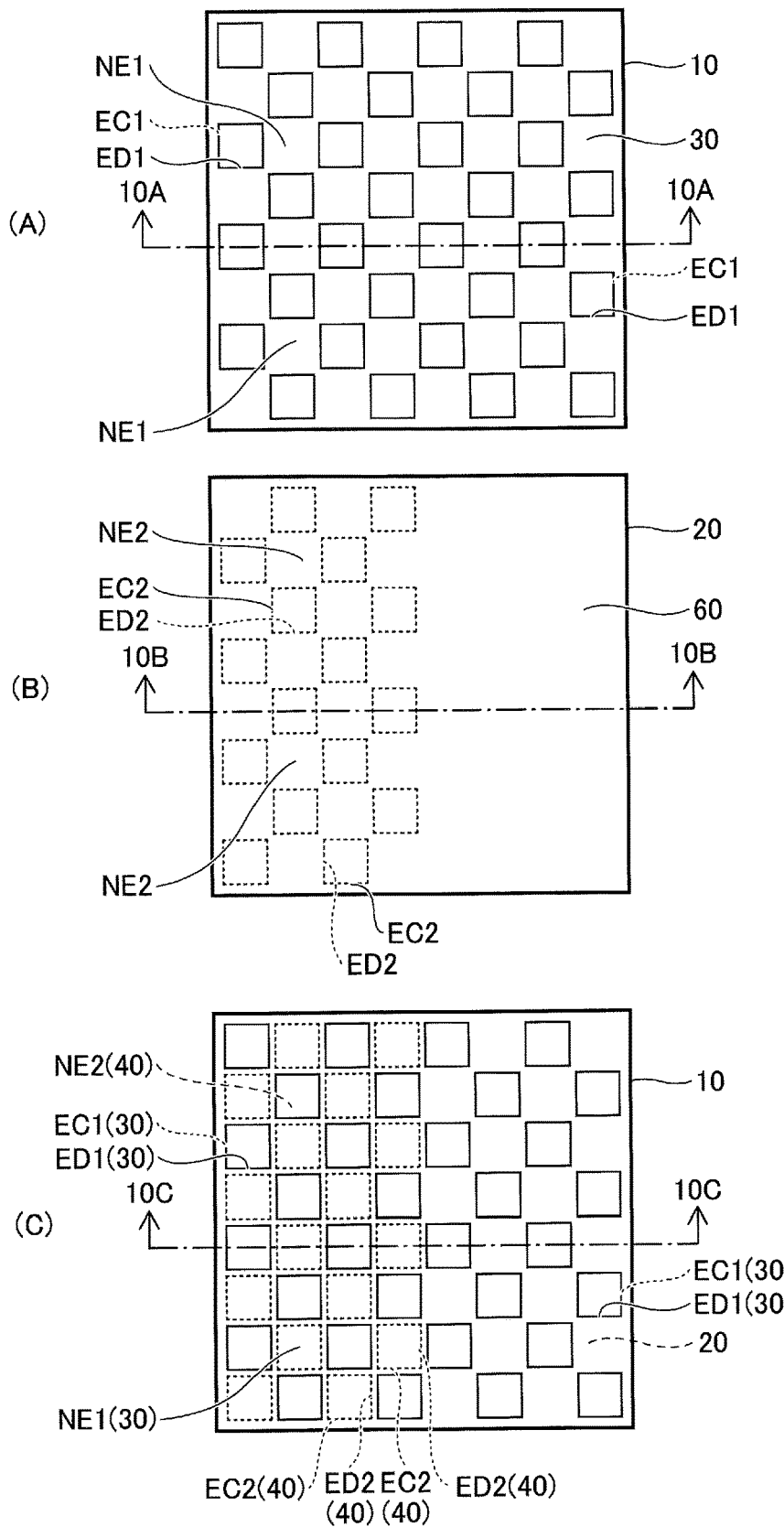
FIG. 9(A) is an enlarged view of a portion of FIG. 8(A) surrounded by a line 9A.
FIG. 9(B) is an enlarged view of a portion of FIG. 8(B) surrounded by a line 9B.
FIG. 9(C) is an enlarged view of a portion of FIG. 7 surrounded by a line 9C.
Figure 10:
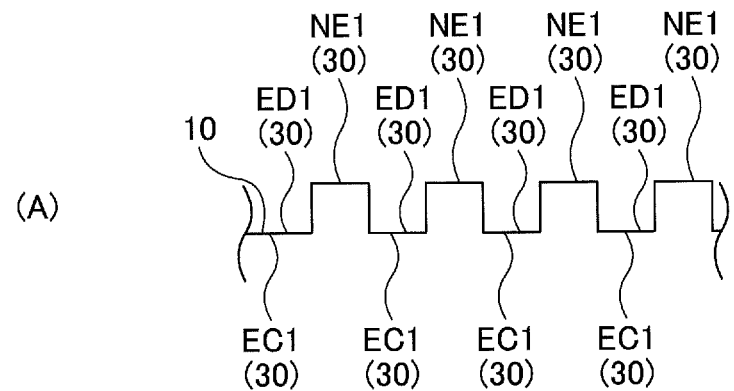
FIG. 10(A) is a cross-sectional view of FIG. 9A taken along a line 10A-10A.
FIG. 10(B) is a cross-sectional view of FIG. 9(B) taken along a line 10B-10B.
FIG. 10(C) is a cross-sectional view of FIG. 9(C) taken along a line 10C-10C.
Figure 10:
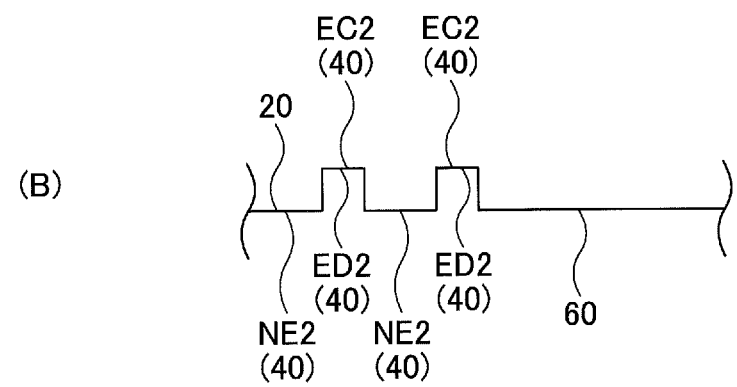
Figure 10:
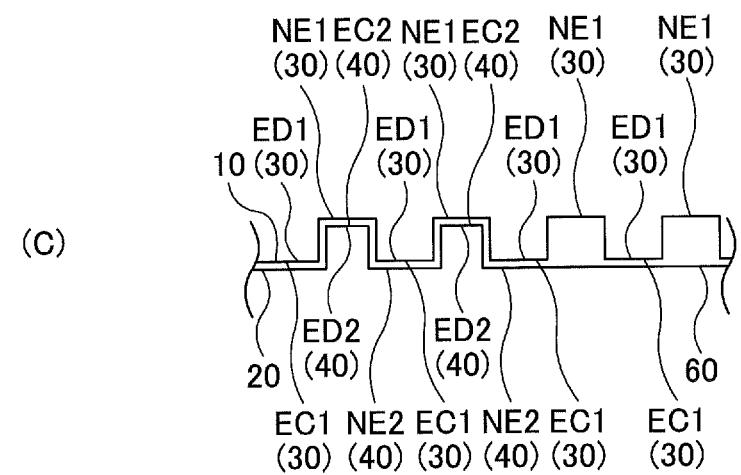

Here, the non-embossed-protrusion portion NE1 illustrates a portion in which no protrusion is formed surrounded by multiple embossed protrusion EC1 (see FIG. 9 and FIG. 10).

The embossed portion 30 and the non-embossed portion 50 are examples of the first embossed portion and the first non-embossed portion formed on the first sheet constituting the hygienic thin-leaf paper of the present invention.

In the crepe paper 20, the multiple embossed recesses ED2 corresponding to the embossed protrusions EC2 and the embossed protrusion EC2 are formed on the front and rear surfaces of the crepe paper 20 (see FIG. 9).

The top of each embossed protrusion EC2 (or the opening of the embossed recess ED2) has a quadrangle shape in its plane view (see FIG. 9).

The side surfaces of the embossed protrusion EC2 (or the embossed recesses ED2) are formed by a taper tapered from the bottom of the embossed recesses ED2 toward the openings.

The embossed protrusion EC2 is formed on one side of the crepe paper 20 by pressing a protruding emboss roll, not illustrated, against the crepe paper 20 in a manner similar to the crepe paper 10.

On the other hand, the embossed recess ED2 is formed on the other surface of the crepe paper 20 as the embossed recess corresponding to the embossed protrusion EC2 (see FIG. 9 and FIG. 10).

The crepe paper 20 has the embossed portion 40 and the non-embossed portion 60.

The multiple embossed protrusions EC2 and the multiple non-embossed-protrusion portions NE2 are formed in the embossed portion 40.

Meanwhile, the multiple embossed protrusions EC2 and the multiple non-embossed-protrusion portions NE2 are not formed in the non-embossed portion 60 (see FIGS. 8 to 10).

Here, the non-embossed-protrusion portion NE2 illustrates a portion in which no protrusion is formed surrounded by multiple embossed protrusions EC2 (see FIG. 9 and FIG. 10).

The embossed portion 40 and the non-embossed portion 60 are examples of a second embossed portion and a second non-embossed portion formed on the second sheet forming the hygienic thin-leaf paper of the present invention.

In the kitchen paper 100 of the third embodiment, the crepe paper 10 and the crepe paper 20 are integrated by facing the forming surfaces of the embossed protrusion EC1 and EC2 in a nested form.

Specifically, the embossing convex EC1 of the crepe paper 10 is disposed opposite to the non-embossed-protrusion portion NE2 of the crepe paper 20 (a portion in which the embossing convex EC2 is not disposed).

On the other hand, the embossed protrusion EC2 of the crepe paper 20 is disposed opposite to the non-embossed-protrusion portion NE1 (the portion in which the embossed protrusion EC1 is not provided) of the crepe paper 10 (see FIGS. 7 to 10).

The top of the embossed protrusion EC1 of the crepe paper 10 is bonded to the non-embossed-protrusion portion NE2 of the crepe paper 20 by an adhesive bond (see FIG. 10) not illustrated.

By bonding the top of the embossed protrusion EC1 of the crepe paper 10 to the non-embossed-protrusion portion NE2 of the crepe paper 20, the bonded portions of the two crepe papers 10 and 20 can be balanced on the side of the one crepe paper (the crepe paper 10).

Accordingly, it is possible to reduce the deterioration of the absorption performance due to the adhesive bond.

IN a manner similar to the kitchen paper of FIG. 1, the adhesive bond may be a known adhesive bond employed as the kitchen paper having a laminated structure.

Instead of bonding the top of the embossed protrusion EC1 of the crepe paper 10 to the non-embossed-protrusion portion NE2 of the crepe paper 20, the top of the embossed protrusion EC2 of the crepe paper 20 and the non-embossed-protrusion portion NE1 of the crepe paper 10 may be bonded.

Further, the top of the embossed protrusion EC1 of the crepe paper 10 may be bonded to the non-embossed-protrusion portion NE2 of the crepe paper 20, and the top of the embossed protrusion EC2 of the crepe paper 20 may be bonded to the non-embossed-protrusion portion NE1 of the crepe paper 10.

In a third embodiment, as illustrated in FIGS. 7-10, the non-embossed portion 50 of the crepe paper 10 and the non-embossed portion 60 of the crepe paper 20 have a shape without an intersection.

Said differently, there is no intersection between the non-embossed portions in the non-embossed portions 50 and 60 of the crepe paper 10, 20.

Specifically, the embossed protrusion NC1 is formed on a portion that can be an intersection including the non-embossed portion 50 of the crepe paper 10, and the embossed portion NC2 is formed on the portion that can be an intersection including the non-embossed portion 60 of the crepe paper 20 (see FIGS. 7 to 10).

In the third embodiment illustrated in FIG. 7, because there is no intersection in the non-embossed portions 50 and 60 where there is a possibility that oil and so on may remain in the non-embossed portions 50 and 60, the dispersion of the oil and so on can be further improved, and the backing-off of the oil and so on can be further reduced (see FIG. 7).

The shape of the non-embossed portion 50 and the non-embossed portion 60 without the intersection is an example of a shape in which the non-embossed portion of the present invention does not have the intersection.

Within the third embodiment, as illustrated in FIGS. 7 to 10, the embossed portion 30 and the non-embossed portion 50 are formed on the crepe paper 10, and the embossed portion 40 and the non-embossed portion 60 are formed on the crepe paper 20 so that the non-embossed portion 50 of the crepe paper 10 faces the embossed portion 40 of the crepe paper 20, and the non-embossed portion 60 of the crepe paper 20 faces the embossed portion 30 of the crepe paper 10.

In the third embodiment, by adopting such a structure, because the non-embossed portion 50 of the crepe paper 10 and the non-embossed portion 60 of the crepe paper 20 do not face each other between the crepe paper 10 and the crepe paper 20, the non-embossing space to be easily collapsed are not formed between the crepe paper 10 and the crepe paper 20 (see FIG. 10).

Therefore, within the third embodiment, the strength in the thickness direction against the load of the kitchen paper 100 can be high so as to improve the absorption performance during loading (e.g., reduction of the backing of the oil and so on of the kitchen paper 100).

Further, in the structure where the non-embossed portion 50 of the crepe paper 10 and the non-embossed portion 60 of the crepe paper 20 do not face each other, because the non-embossed portions 50 and 60 are dispersed in the kitchen paper 100, oil and so on can easily diffuse through the non-embossed portions 50 and 60 (see FIGS. 7 to 10).

Therefore, according to the third embodiment, the dispersion property of the absorbed oil and so on can be maintained without forming the non-embossed space.

Further, as illustrated in FIG. 7, in the third embodiment, in the structure where the non-embossed portions do not face each other between the crepe paper 10 and the crepe paper 20, the non-embossed space is not formed between the crepe paper 10 and the crepe paper 20.

Accordingly, in the third embodiment illustrated in FIG. 7, there is no space where the non-embossed spaces intersects (a portion where oil and so on tend to accumulate).

Therefore, within the third embodiment, from the viewpoint of preventing oil and so on from remaining in the space where the non-embossed spaces intersects, the dispersion property of the oil and so on can be improved, and the backing-off of the oil and so on can be reduced.

Incidentally, as illustrated in FIG. 7, a structure in which a non-embossed space is not formed between the crepe paper 10 and the crepe paper 20 is an example of a structure in which a non-embossed portion of the present invention is not formed in opposite spaces.

In the third embodiment, as illustrated in FIG. 7, the non-embossed portions 50 and 60 are dispersed in the kitchen paper 100 (see FIGS. 7 and 8).

Accordingly, in the third embodiment illustrated in FIG. 7, designability can be maintained without forming the non-embossed space.

Further, within the third embodiment, a laminated structure of a nested-type is employed. Therefore, the contact area with the object to be used (e.g., tableware, fried goods, etc.) of the kitchen paper 100 can be reduced. Even a load is applied to the kitchen paper during use, it is difficult to collapse the space inside the kitchen paper 100.

Furthermore, even if the non-embossed space is not provided between the crepe paper 10 and the crepe paper 20, the dispersion property of the oil and so on can be improved, and the backing-off of the oil and so on can be reduced (see FIGS. 7 to 10).

Therefore, within the third embodiment, the weight of the crepe paper 10, 20 and the paper thickness can be reduced, and the thickness of the kitchen paper 100 can be reduced.

In the third embodiment, as illustrated in FIG. 7, the kitchen paper 100 has two or more regions, and the crepe paper 10 and 20 forming the kitchen paper 100 each have two or more regions (sheet regions).

As illustrated in FIG. 8(A), the sheet region of the crepe paper 10 (the first sheet region 11, the second sheet region 12, the third sheet region 13, and the fourth sheet region 14) is formed with a region not having the non-embossed portion 50 and a region having the non-embossed portion 50.

Meanwhile, as illustrated in FIG. 8(B), the sheet region of the crepe paper 20 (the sheet region 21 of the fifth sheet, the sheet region 22 of the sixth sheet, the sheet region 23 of the seventh sheet, and the sheet region 24 of the eighth sheet region) is formed with a region having no non-embossed portion 60 and a region having a non-embossed portion 60.

The region having the non-embossed portion 50 and the region having the non-embossed portion 60 are arranged so as not to overlap each other.

Specifically, as illustrated in FIG. 7, the kitchen paper 100 has four regions 70. Four regions 70 can be divided into first regions 71 to fourth regions 74.

Of the four regions 70, the non-embossed portion 60 of the crepe paper 20 is disposed in the first region 71 and the third region 73, and the non-embossed portion 50 of the crepe paper 10 is disposed in the second region 72 and the fourth region 74.

In the third embodiment, as illustrated in FIG. 8(A), the embossed portion 30 of the crepe paper 10 is divided into the first embossed region 31 to the fourth embossed region 34, and the non-embossed portion 50 of the crepe paper 10 is divided into the second non-embossed region 52 and the fourth non-embossed region 54.

Further, as illustrated in FIG. 8(B), the embossed portion 40 of the crepe paper 20 is divided into the first embossed region 41 to the fourth embossed region 44, and the non-embossed portion 60 of the crepe paper 20 is divided into the first non-embossed region 61 and the third non-embossed region 63.

Thus, in the first region 71 of the four regions of the kitchen paper 100, the first embossed region 31 of the crepe paper 10 and the first non-embossed region 61 of the crepe paper 20 face each other.

In the second region 72, the second non-embossed region 52 of the crepe paper 10 and the second embossed region 42 of the crepe paper 20 face each other.

Further, in the third region 73, the third embossed region 33 of the crepe paper 10 and the third non-embossed region 63 of the crepe paper 20 face each other.

In the fourth region 74, the fourth non-embossed region 54 of the crepe paper 10 and the fourth embossed region 44 of the crepe paper 20 face each other (see FIGS. 7 to 10).

In the third embodiment, the non-embossed portion 50 of the crepe paper 10 is disposed in the second and fourth regions 72, 74, and the non-embossed portion 60 of the crepe paper 20 is disposed in the first and third regions 71, 73.

In such a structure, the non-embossed regions 52 and 5461, 63 of the non-embossed portions 50 and 60 located in the four regions do not face each other between the crepe paper 10 and the crepe paper 20.

Therefore, the non-embossed space (the collapsible space) is not formed in which the non-embossed portions face each other (see FIGS. 7 to 10).

Thus, within the third embodiment, the area of each non-embossed region 52, 54, 61, 63 of the non-embossed portions 50 and 60 formed on each crepe paper can be increased.

As a result, in the third embodiment, the thickness direction strength for the load can be maintained and the absorption performance can be improved during loading.

Further, in the third embodiment, even in the absence of the non-embossed space, it is possible to suppress the decrease in dispersion property, such as oil dispersion, and to maintain the designability (see FIGS. 7 to 10).

In the third embodiment, the pattern of the non-embossed portion 50 of the crepe paper 10 facing the embossed portion 40 of the crepe paper 20 and the pattern of the non-embossed portion 60 of the crepe paper 20 facing the embossed portion 30 of the crepe paper 10 are 90° by n rotationally symmetrical.

Where n is an odd number.

Specifically, as illustrated in FIGS. 7 and 8, the pattern of the non-embossed portion 50 of the crepe paper 10 and the pattern of the non-embossed portion 60 of the crepe paper 20 are in a rotational symmetry of 90° or 270°.

The pattern shape of the non-embossed portion is optional.

In the third embodiment illustrated in FIG. 7, as illustrated in FIG. 8, the shape of the pattern is cross-shaped.

By forming the non-embossed portions 50 and 60, each of which has a pattern of rotationally symmetric positional relations, on the crepe paper 10, 20, a non-embossed portion may be regularly disposed between the crepe paper 10 and the crepe paper 20.

Said differently, as illustrated in FIG. 7, the pattern of non-embossed portions 50 and 60 may exhibit a geometric pattern when viewed over the entire kitchen paper 100.

Therefore, within the third embodiment illustrated in FIG. 7, even without the non-embossed space, it is possible to further reduce the decrease in dispersion property such as oil, and it is possible to maintain the designability.

In another mode, in the third embodiment, as illustrated in FIG. 7, the pattern of the non-embossed portion 50 of the crepe paper 10 facing the embossed portion 40 of the crepe paper 20 and the pattern of the non-embossed portion 60 of the crepe paper 20 facing the embossed portion 30 of the crepe paper 10 are in the linear symmetry.

By forming the non-embossed portions 50 and 60 having a pattern that is in the linear symmetric position relation on the crepe paper 10, 20, respectively, the non-embossed portions 50 and 60 may be arranged regularly between the crepe paper 10 and the crepe paper 20 (see FIGS. 7 and 8).

Therefore, within the third embodiment illustrated in FIG. 7, it is possible to further suppress the degradation of the dispersion property of the oil and so on, and it is possible to maintain the designability.

Further, in the kitchen paper 100 illustrated in FIG. 7, the area ratio of the non-embossed portion 50 of the crepe paper 10 and the non-embossed portion 60 of the crepe paper 20 (the ratio of the area of the non-embossed portion to the sheet surface on which the non-embossed portion is formed) is 3 to 16%, preferably 5 to 13%, and more preferably 6 to 11%.

If the area ratio of the non-embossed portions 50 and 60 is less than 3%, the dispersion property of the oil and so on may not be sufficiently obtained.

Further, when the area ratio of the non-embossed portions 50 and 60 exceeds 13%, the number of the embossed portions is small. Therefore, the sufficient strength against the applied load in the thickness direction may not be possibly obtained.

Figure 11:
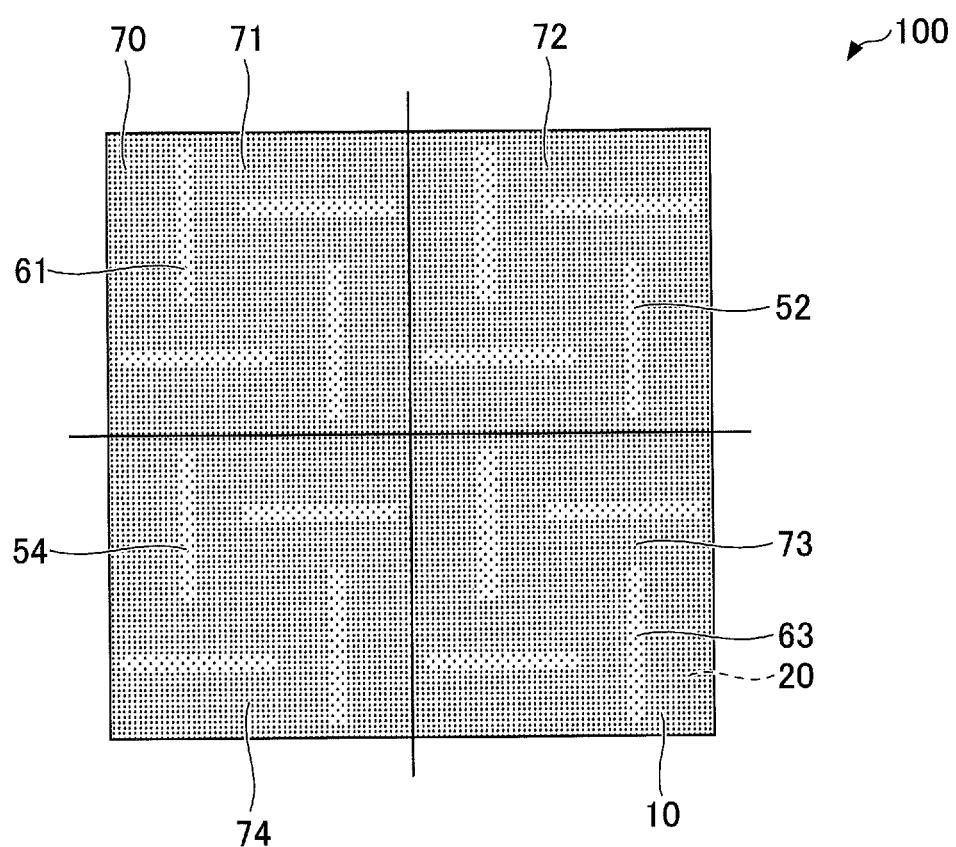
FIG. 11 illustrates a kitchen paper according to the embodiment (fourth embodiment).

FIG. 11 illustrates kitchen paper according to an embodiment (a fourth embodiment) of the present invention. FIGS. 12(A) and 12(B) illustrate the crepe paper that forms the kitchen paper of FIG. 11.

Figure 12:
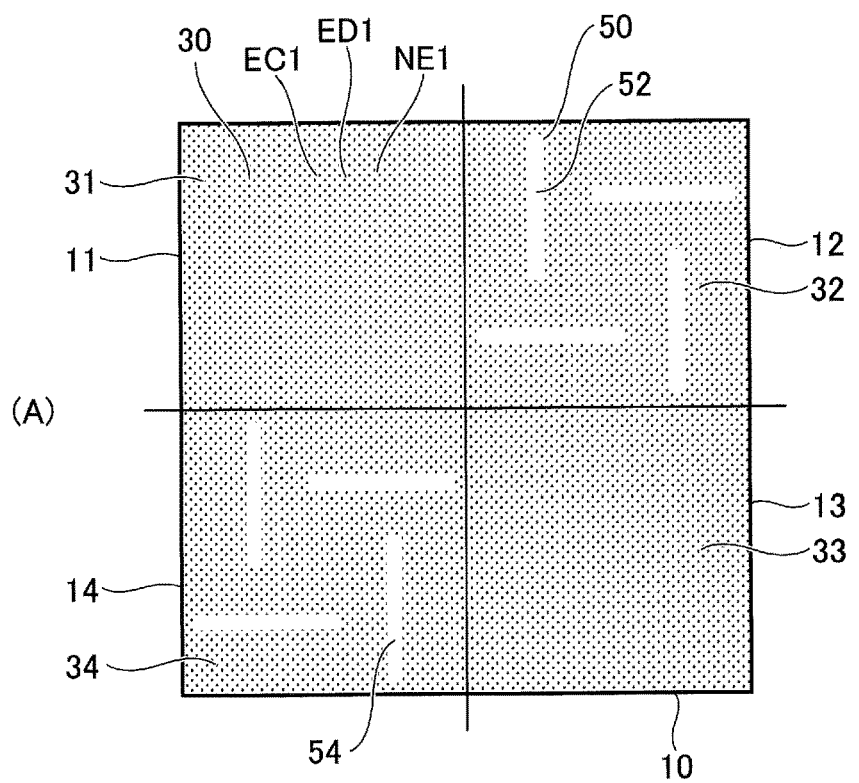
FIGS. 12(A) and 12(B) illustrate a crepe paper that constitutes the kitchen paper of FIG. 11.
Figure 12:
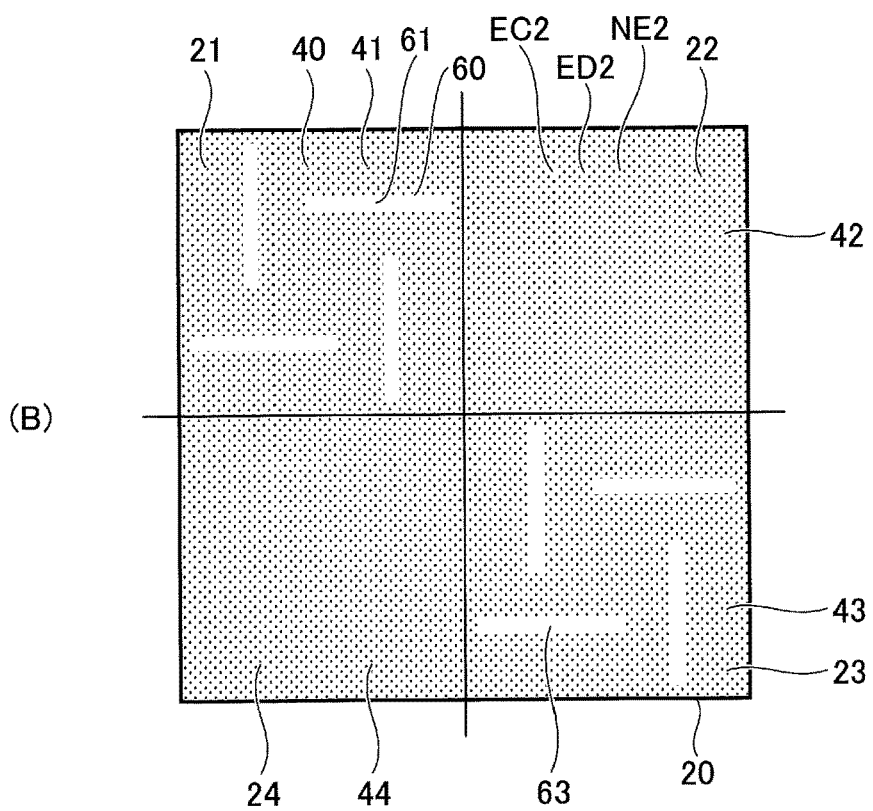

In the fourth embodiment illustrated in FIGS. 11 and 12, the pattern of the non-embossed portion 50 of the crepe paper 10 facing the embossed portion 40 of the crepe paper 20 and the pattern of the non-embossed portion 60 of the crepe paper 20 facing the embossed portion 30 of the crepe paper 10 are in a rotational symmetry of 90°×n (n is an odd number).

Specifically, the pattern of the non-embossed portion 50 of the crepe paper 10 and the pattern of the non-embossed portion 60 of the crepe paper 20 are in a rotational symmetry of 90° or 270°.

In the fourth embodiment of FIG. 11, as illustrated in FIG. 12, each non-embossed region 52, 54, 61, and 63 is formed of four rectangles.

In the fourth embodiment illustrated in FIGS. 11 and 12, the non-embossed portions 50 and 60 having a pattern that becomes a rotationally symmetric position relation can be formed on the crepe paper 10 and 20, respectively, so that non-embossed portions can be arranged regularly between the crepe paper 10 and the crepe paper 20.

Said differently, as illustrated in FIG. 11, the pattern of the non-embossed portions 50 and 60 may exhibit a geometric pattern when viewing the entire kitchen paper 100.

Therefore, within the fourth embodiment, even without the non-embossed space, it is possible to further reduce the decrease in dispersion property, such as oil, and to maintain the designability.

Further, in the example of FIG. 11, the pattern of the non-embossed portion 50 of the crepe paper 10 facing the embossed portion 40 of the crepe paper 20 and the pattern of the non-embossed portion 60 of the crepe paper 20 facing the embossed portion 30 of the crepe paper 10 are also linearly symmetrical.

By forming the non-embossed portions 50 and 60 having a pattern of line symmetric positional relations in each of the crepe sheets 10, 20, the non-embossed portions 50 and 60 may also be regularly disposed between the crepe paper 10 and the crepe paper 20.

Therefore, within the fourth embodiment illustrated in FIG. 11, the dispersion property of the oil and so on can be further suppressed from degrading, and the designability can be maintained.

EXAMPLE

Further, the present invention will be described in detail together with examples. The measurements and evaluations of the examples and comparative examples are performed as follows.

[Raw Paper]
[Basis Weight]

A basis weight of crepe paper for kitchen paper (raw paper) used in a test (paper weight in gsm, $g/m^2$) is calculated in conformity with JIS P 8124 (1998).

[Bulk]

Measure the bulk (5-ply) (mm) of the kitchen paper. The bulk of the kitchen paper is cut into the test pieces of 12 cm×12 cm and is sufficiently humidified under the conditions of JIS P 8111 (1998). Thereafter, the test pieces are measured under the same conditions using the dial thickness gauge (a thickness measuring instrument) "PEACK G" type (Ozaki Manufacturing Co., Ltd.).

The specific procedure of the measurement is to check that there is not dust or the like between the plunger and the measuring table, place the plunger on the measuring table, and move a memory of the dial of the thickness gauge to align the zero point. The plunger is then raised to place the test piece on the table, the plunger is slowly lowered, and the gauge is read at that time. At this time, the plunger should be merely put on.

A terminal of the plunger is made of metal, and a circular plane having a diameter of 30 mm contacts in perpendicular to the paper plane. The load for measuring this bulk is about 70 gf at 120 μm. The bulk measurement value is an average value obtained after measurements by 10 times.

[Oil Absorption Test]

A measurement method for an oil absorption test (a test for oil absorption) is as follows. At first, the test piece 200 is cut to have 12 cm×12 cm, as in the measurement of bulk.

Figure 13:
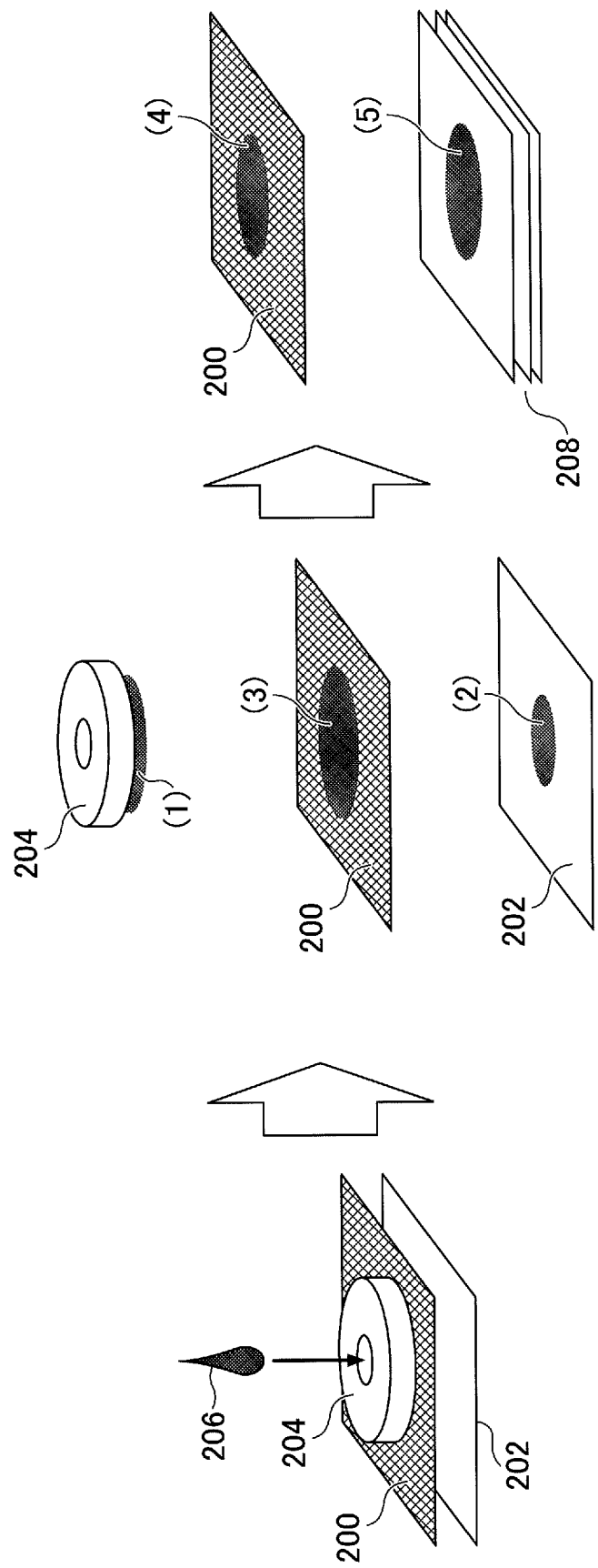
FIG. 13 illustrates a measurement method of an oil absorption test.
Figure 14:
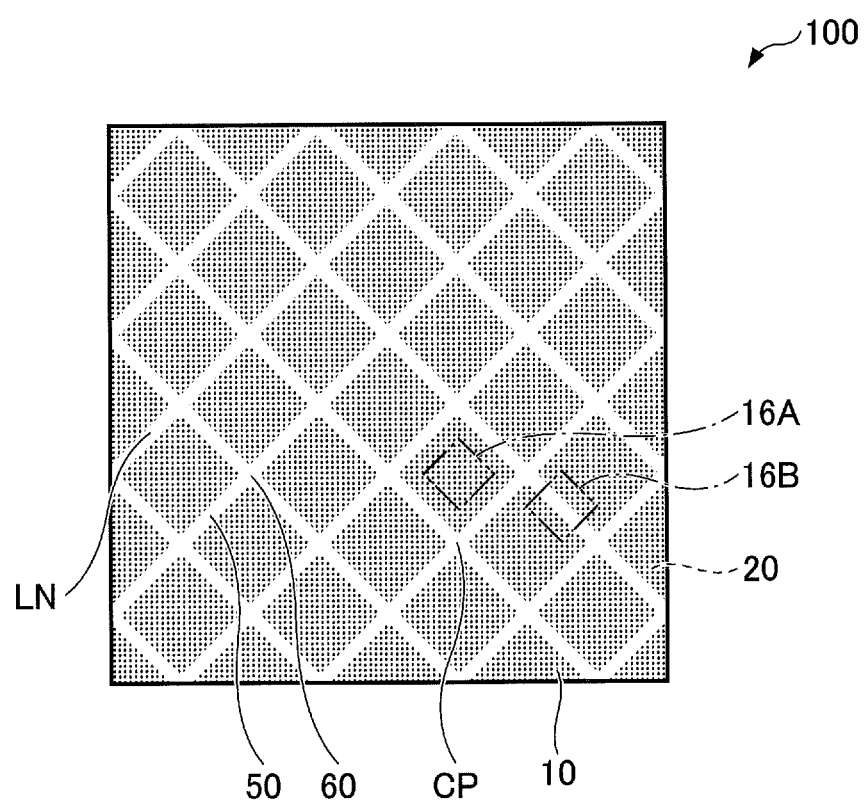
FIG. 14 illustrates a kitchen paper according to a comparative example 1.
Figure 15:
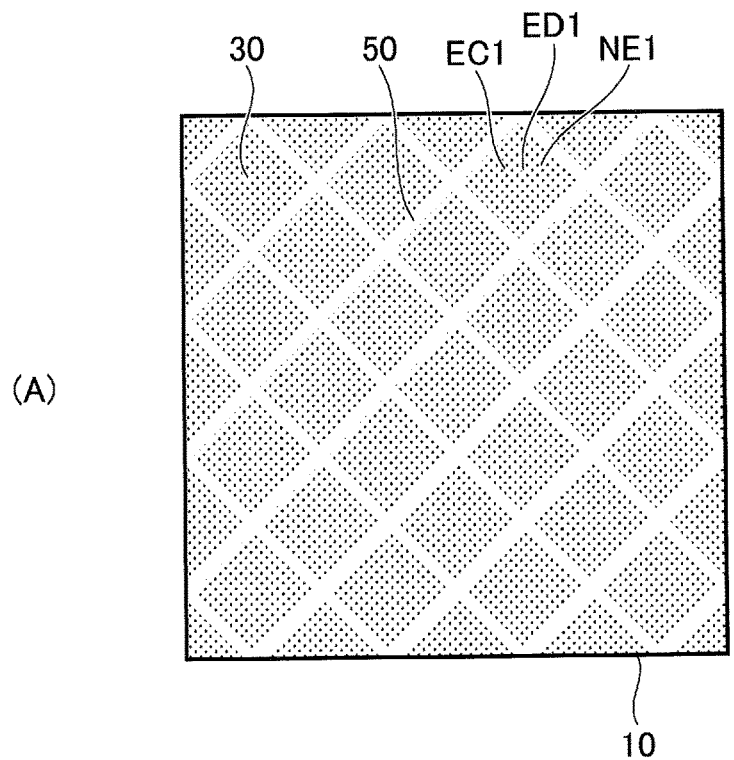
FIGS. 15(A) and 15(B) illustrate a crepe paper that constitutes the kitchen paper of FIG. 14.
Figure 15:
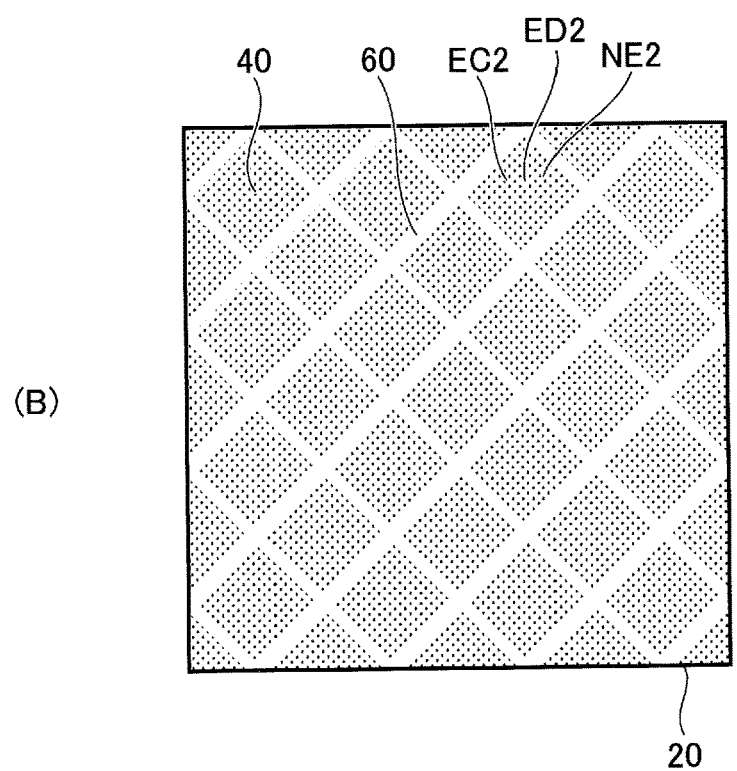
Figure 16:
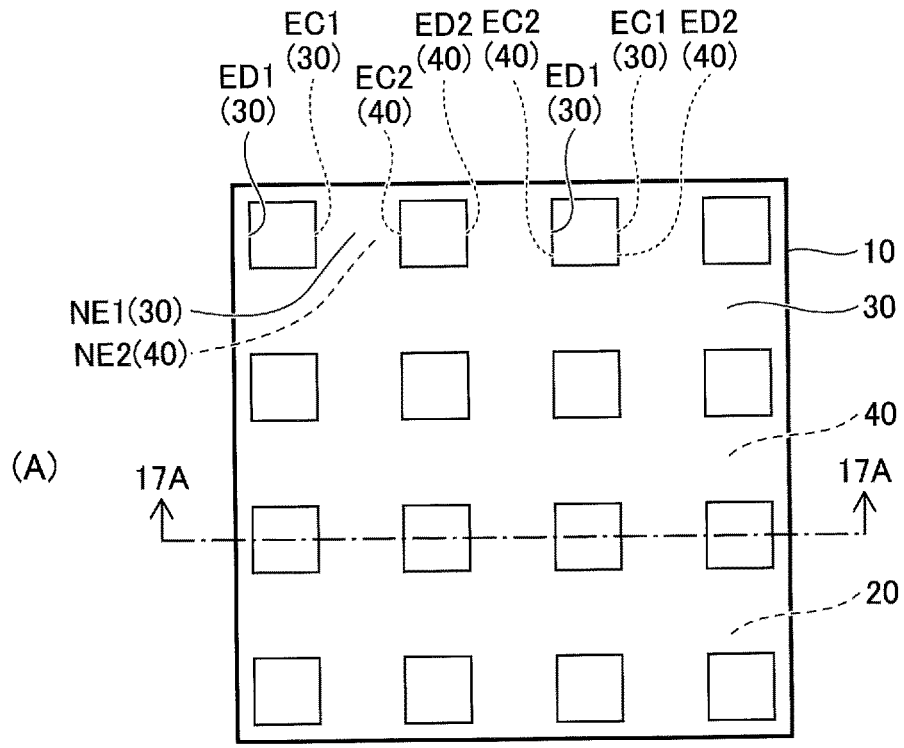
FIG. 16(A) is an enlarged view of a portion of FIG. 14 surrounded by a line 16A.
FIG. 16(B) is an enlarged view of a portion of FIG. 14 surrounded by a line 16B.
Figure 16:
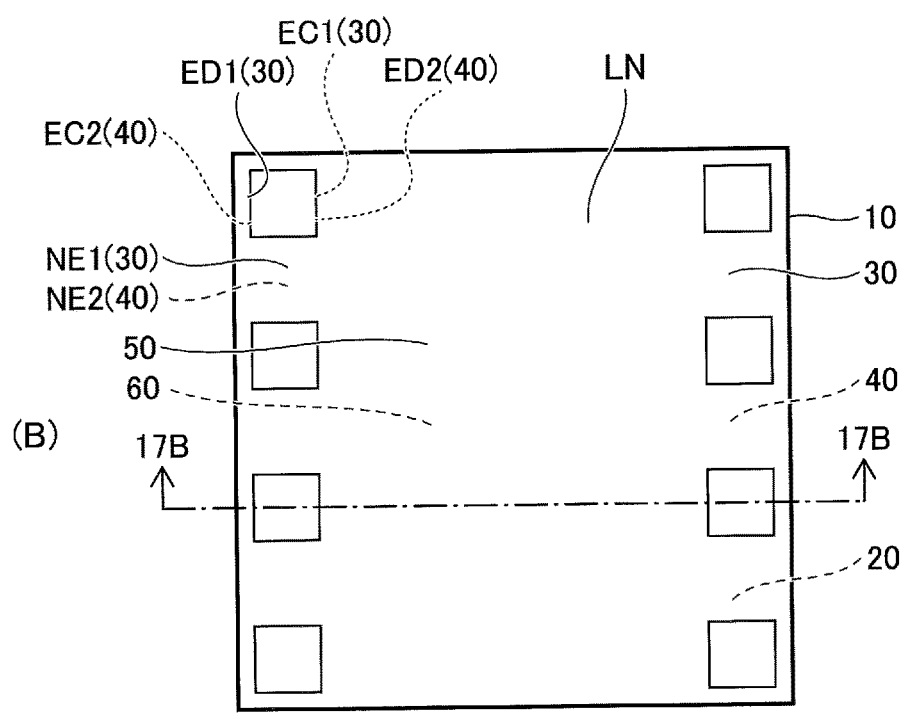
Figure 17:
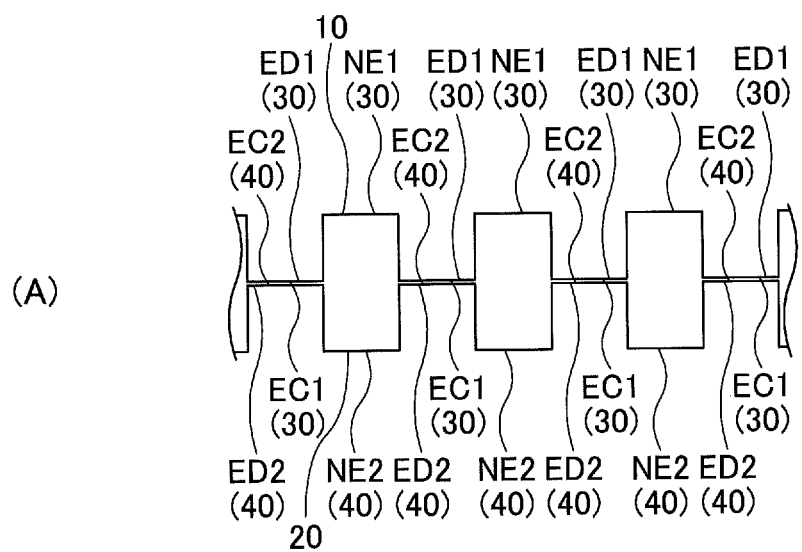
FIG. 17(A) is a cross-sectional view of FIG. 16(A) taken along a line 17A-17A.
FIG. 17(B) is a cross-sectional view of FIG. 16(B) taken along a line 17B-17B.
Figure 17:
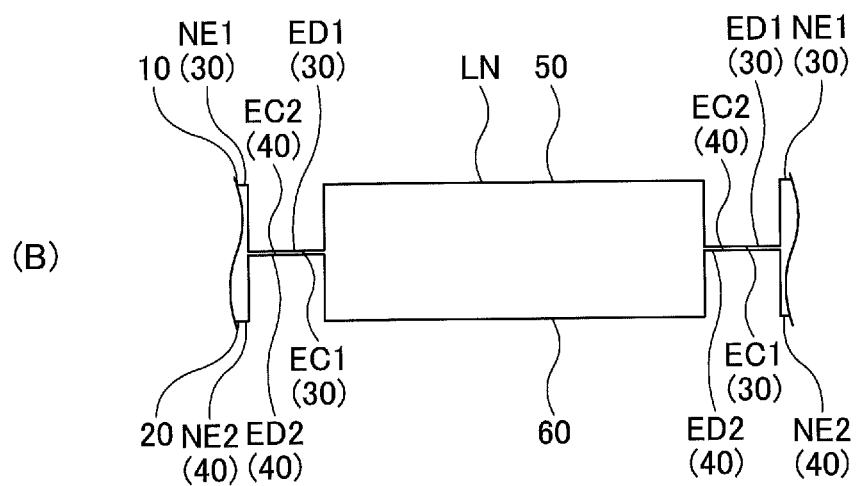
Figure 18:
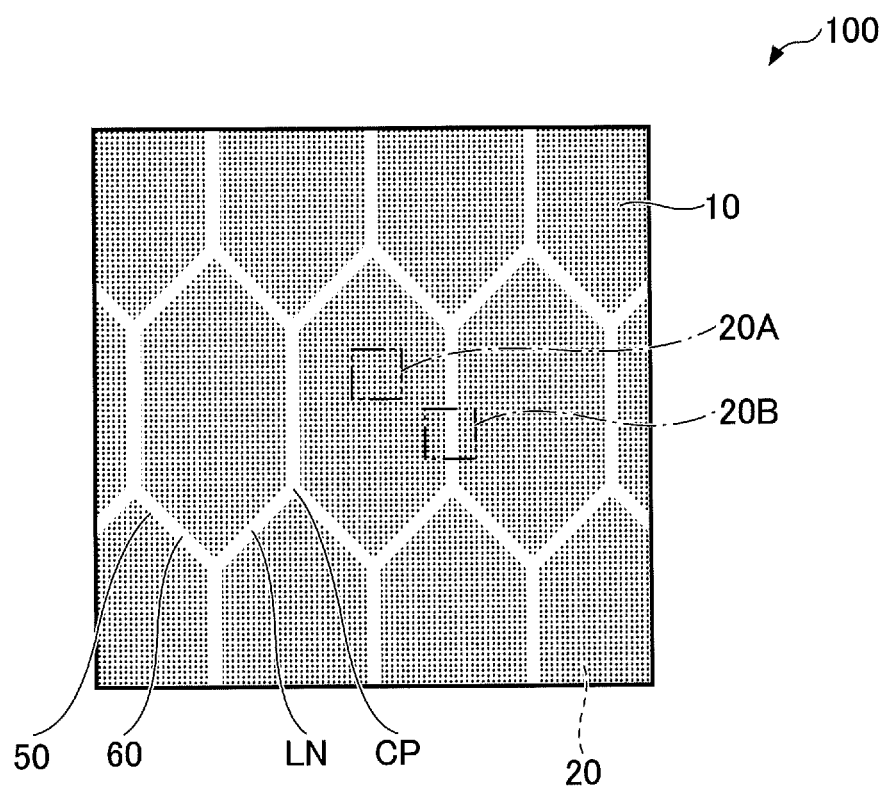
FIG. 18 illustrates a kitchen paper according to comparative example 2.
Figure 19:
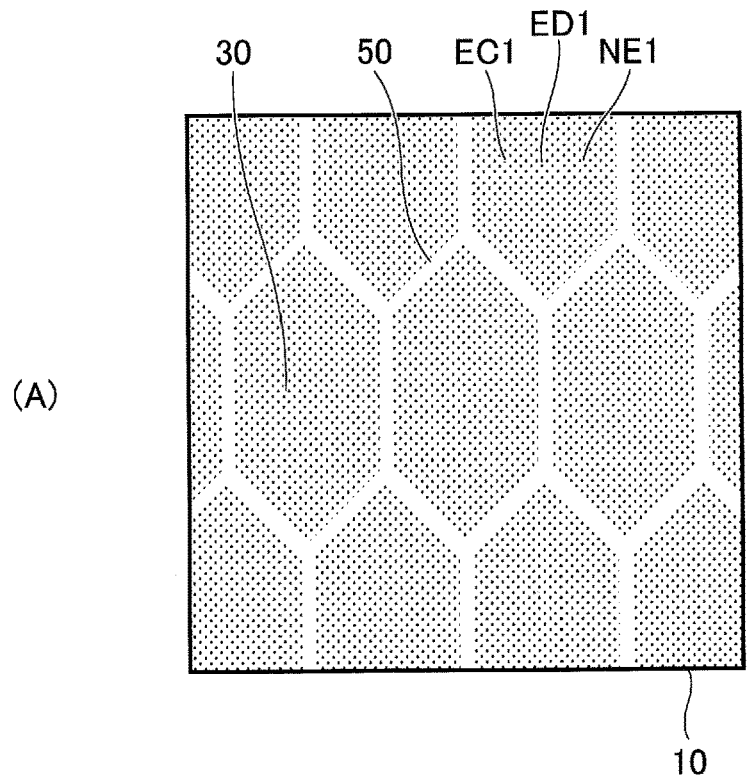
FIGS. 19(A) and 19(B) illustrate a crepe paper that constitutes the kitchen paper of FIG. 18.
Figure 19:
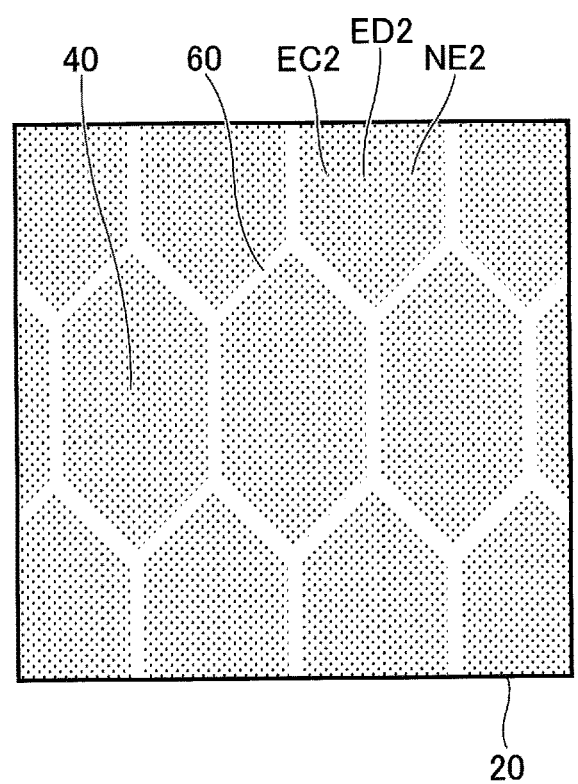
Figure 20:
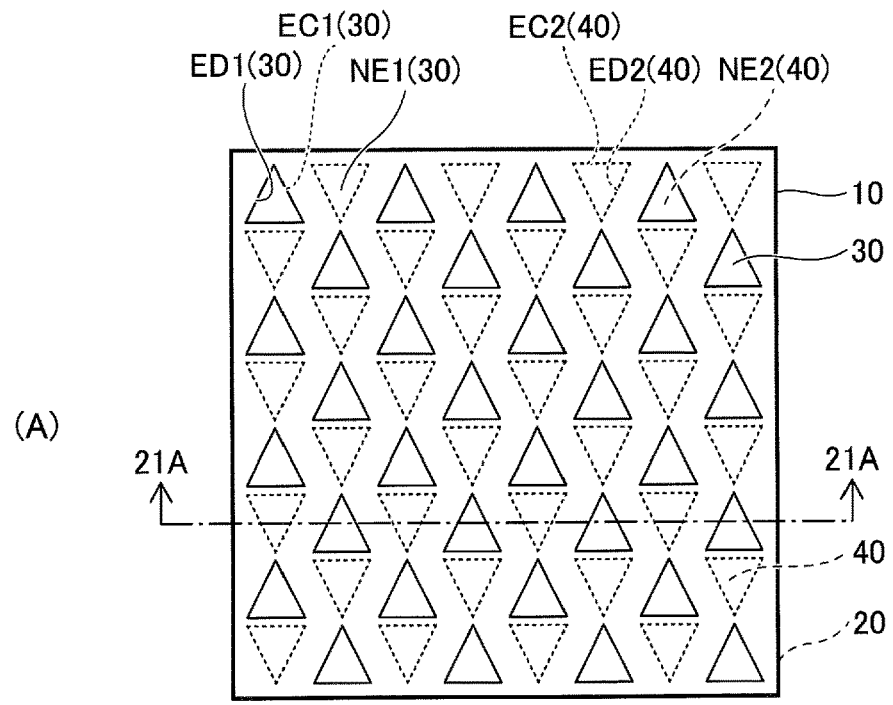
FIG. 20(A) is an enlarged view of a portion of FIG. 18 surrounded by a line 20A.
FIG. 20(B) is an enlarged view of a portion of FIG. 18 surrounded by a line 20B.
Figure 20:
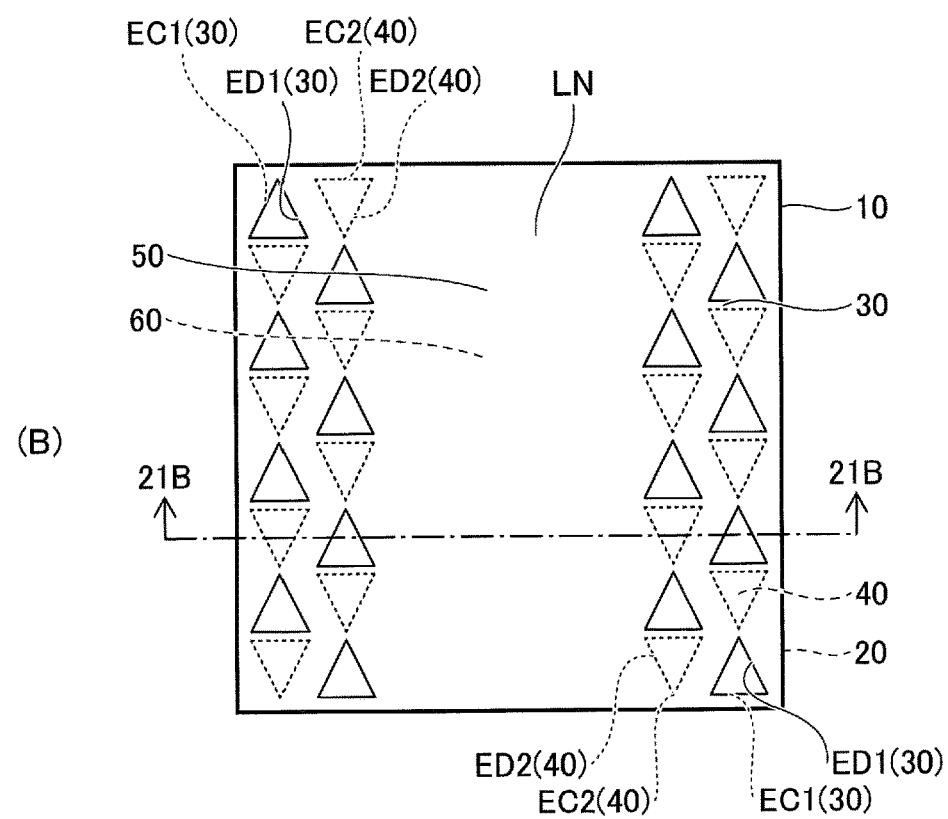
Figure 21:
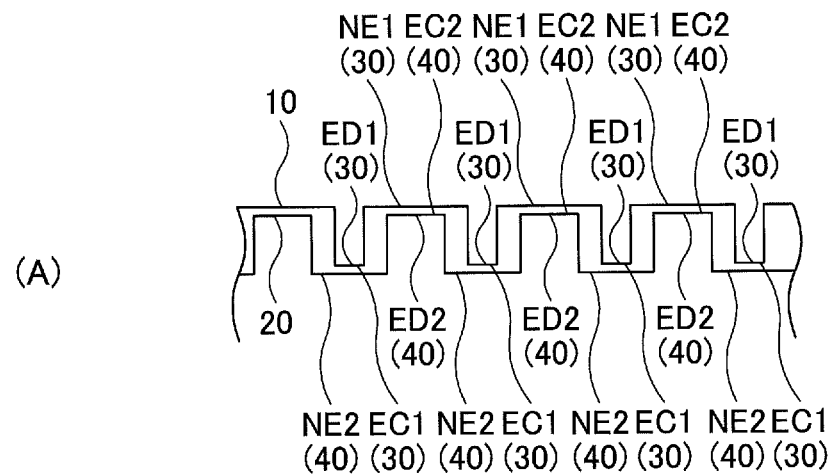
FIG. 21(A) is a cross-sectional view of FIG. 20(A) taken along a line 21A-21A.
FIG. 21(B) is a cross-sectional view of FIG. 20(B) taken along a line 21B-21B.
Figure 21:
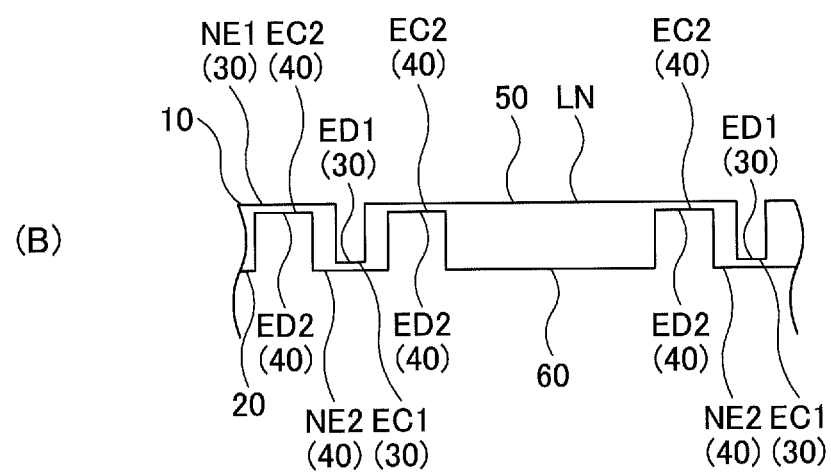

Each weight of a plastic sheet 202 (dimension: about 12 cm×12 cm, thickness: 0.2 mm, weight: 2.7 g, material: polypropylene), test piece 200, weight 204 (diameter: about 82 mm, thickness: 10 mm, weight: 59 g, material: acrylic), and lower paper 208 (copy paper cut to about 12 cm×12 cm) is cut out using an electronic balance (e.g., HR300 manufactured by A & Day, Inc.), as illustrated in FIG. 13.

After the measurement, the test piece 200 is placed on the plastic sheet 202 and the weight 204 is placed in the center of the test piece 200. The weight 204 has a hole that penetrates in its thick direction. The diameter of the hole is about 12 mm.

Then, 2.3 ml (about 2.0 g) of the oil 206 (salad oil at a normal temperature, namely, Nisshin Salad Oil, manufactured by Nisshin Oil Group Co., Ltd.) is dripped through the hole in the weight 204 with a pipette (FinnpipetteF2, 0.5-5 ml, manufactured by Thermo Scientific).

At this time, the dripping position (an embossed portion) is fixed at the center position of the test piece 200 as illustrated in FIG. 13.

After dripping 2 minutes, the weight 204 is removed, and the weight is measured (a return amount (1) in FIG. 13). Then, the plastic sheet 202 is removed and the weight (the back-out amount (2) in FIG. 2) is measured.

Then, the weight of the test piece 200 (the amount absorbed in (3)) is measured, and the test piece 208 is placed again on the lower paper 208. After a passage of additional 5 minutes, the weight of the test piece 200 (the amount of the finally retained oil, namely, a final retention amount of (4)) and the amount of the oil (the amount of the oil that could not be retained, namely, a final back-out amount of (5)) in the lower paper 208 are measured (see FIG. 13).

For each test piece 200, referring to FIG. 13, a test piece oil absorption amount (g), a back-out amount (g), a return amount (g), an amount of the oil dropped (g), final retention amount (g), total back-out amount (g), a test piece oil absorption rate relative to the amount of the oil dropped (%), a back-out rate (%), a return rate (%), a final retention rate (%), and a total back-out rate (%) are measured and the results are listed in Table 1.

Each item of the test piece oil absorption amount (g) and so on was calculated using equations listed below.

test piece oil absorption amount (g)=test piece weight 2 minutes after dripping−test piece weight back-out amount (g)=plastic sheet weight 2 minutes after dripping−plastic sheet weight return amount (g)=the weight of a balance weight−the weight of the balance weight after 2 minutes of dripping amount of the oil dropped (g)=the test piece oil absorption amount+the back-out amount+the return amount final retention amount (g)=the test piece weight after 5 minutes−the test piece weight final back-out amount (g)=the weight of the lower paper after 5 minutes−the weight of the lower paper total back-out amount (g)=the back-out amount+the final total back-out amount test piece oil absorption rate (%)=the test piece oil absorption amount÷the amount of the oil dropped×100 back-out rate (%)=the back-out amount÷the amount of the oil dropped×100 return rate (%)=the return amount÷the amount of the oil dropped×100 final retention rate (%)=the final retention amount÷the amount of the oil dropped×100 final back-out rate (%)=final back-out amount÷the amount of the oil dropped×100 total back-out rate (%)=the total back-out amount÷the amount of the oil dropped×100

The test piece oil absorption amount (g), back-out amount (g), return amount (g), amount of the oil dropped (g), final retention amount (g), final back-out amount (g), and total back-out amount (g) are respectively the average values of three times of the measurements.

The test piece oil absorption rate (%), back-out rate (%), return rate (%), final retention rate (%), final back-out rate (%), and total back-out rate (%) were calculated from the test piece oil absorption amount (g), etc.

Example 1

In Example 1, the kitchen paper 100 of the first embodiment illustrated in FIGS. 1-4 was used. In Example 1, as the raw paper, the two crepe papers 10 and 20, which were made of 100 mass % pulp and 22.1 g/m$^2$ of raw paper, were overlaid up and down (2-ply).

As for emboss conditions, the nested type was adopted. The areas of the embossed protrusions EC1 and EC2 are set to 1.1 mm$^2$. The shapes of the embossed protrusions EC1 and EC2 are set to 1.1 mm$^2$. The shapes of the embossed protrusions EC1 and EC2 are set to be a quadrangle. The pattern of the non-embossed portion 50 is set to be cross-shaped. The total numbers of embossed protrusions EC1 and EC2 are set to be 2090 pieces/144 cm$^2$. The gluing area ratio of the embossed protrusion EC1 of the crepe paper 10 and the non-embossed-protrusion portion NE2 of the embossed protrusion EC1 of crepe paper 10 to the non-embossed-protrusion portion NE2 of the crepe paper 20 (the gluing area ratio of gluing between the non-embossed-protrusion portion NE1 of the crepe paper 10 and the embossed protrusion EC2 of the crepe paper 20) is set to 8.4%. The capacity of the total embossed protrusions EC1 and EC2 are set to 10738 mm$^2$. The area ratio of the non-embossed portion 50 is set to 10.8%.

The conditions and results of Example 1 are listed in Table 1.

Example 2

In Example 2, the kitchen paper 100 of the second embodiment illustrated in FIGS. 5 and 6 was used.

In Example 2, paper weight in gsm of the original paper is 21.5 g/m$^2$. Regarding the above emboss conditions, each pattern formed in the non-embossed regions 51 and 53 of the non-embossed portion 50 is defined as a shape in which four elongated rectangles arranged at predetermined intervals. Each pattern formed in the non-embossed regions 52 and 54 of the non-embossed portions 50 is defined as a shape in which 12 elongated rectangles of the non-embossed regions 52 and 54 are arranged at predetermined intervals. The total number of embossed protrusions EC1 and EC2 is set to 2105 pieces/144 cm$^2$. The total volume of the embossed protrusions EC1 and EC2 is set to be 10759 mm$^2$. The area ratio of the non-embossed portions 50 is set to 10.7%. The other conditions are the same as those in Example 1.

The conditions and results of Example 2 are listed in Table 1.

Example 3

In Example 3, the kitchen paper 100 of the third embodiment illustrated in FIGS. 7-10 was used. In Example 3, the same procedure as in Example 1 was performed except that the non-embossed portion 60 was formed on the crepe paper 20. The conditions and results of Example 3 are listed in Table 1.

Example 4

In Example 4, the kitchen paper 100 of a fourth embodiment illustrated in FIGS. 11 and 12 is used.

In Example 4, regarding the above emboss conditions, the non-embossed regions 52 and 54 of the non-embossed portions 50 and the non-embossed regions 61 and 63 of the non-embossed portions 60 are shaped so that the four elongated rectangles are arranged at predetermined intervals. The total number of embossed protrusions EC1 and EC2 is 2137 pieces/144 cm$^2$. The gluing area ratio of the embossed protrusion EC1 of the crepe paper 10 to the non-embossed-protrusion portion NE2 of the crepe paper 20 (a gluing area ratio of the non-embossed-protrusion portion NE1 of the crepe paper 10 to the embossed protrusion EC2 of the crepe paper 20) is 8.6%, the total volume of the embossed protrusions EC1 and EC2 was 10631 mm², and the area ratio of the non-embossed portion 50 was 6.7%. The total volume of the embossed protrusions EC1 and EC2 is 10631 mm². The other conditions are the same as those in Example 1.

The conditions and results of Example 4 are listed in Table 1.

Comparative Example 1

In Comparative Example 1, the kitchen paper 100 illustrated in FIGS. 14-17 is used.

In Comparative Example 1, a tip-to-tip (TIP TO TIP) format is used as the emboss condition, and the area ratios of the non-embossed portions 50 and 60 were 37.4%, and the patterns of the non-embossed portions 50 and 60 are used in a manner similar to those in Example 1, except that the patterns of the non-embossed portions 50 and 60 are arranged in a lattice shape.

In Comparative Example 1, the non-embossed portion 50 and the non-embossed portion 60 are formed in face-to-face, and a non-embossed space LN having an intersection CP is formed. The conditions and results of Comparative Example 1 are listed in Table 1.

Comparative Example 2

In Comparative Example 2, the kitchen paper 100 illustrated in FIGS. 18-21 was used. In Comparative Example 2, the original paper was used in a manner similar to Example 1 except that the original paper having a paper weight in gsm 21.2 g/m² is used.

With regard to the emboss conditions, the pattern of the non-embossed portion 50 is honeycomb-shaped, the shape of the embossed protrusions EC1 and EC2 is triangular, the total number of the embossed protrusion EC1 and EC2 was 2172 pieces/144 cm². The gluing area ratio of the embossed protrusion EC1 of the crepe paper 10 to the non-embossed-protrusion portion NE1 of the crepe paper 20 is 8.1%. The total capacity of the embossed protrusion EC1 and EC2 is 13275 mm², and the area ratio of the non-embossed portion 50 and 60 was 19.1%, respectively. The other conditions are the same as those in Example 1.

In Comparative Example 2, the non-embossed portion 50 and the non-embossed portion 60 face each other to form a non-embossed space LN having an intersection CP. The conditions and results of Comparative Example 2 are listed in Table 1.

TABLE 1

| | | EXAMPLE 1 | EXAMPLE 2 | EXAMPLE 3 |
|---|---|---|---|---|
| ORIGINAL PAPER | PAPER WEIGHT IN GSM (g/m²) | 22.1 | 21.5 | 22.1 |
| | BULK (5-PLY) (mm) | 3.2 | 3.2 | 3.2 |
| EMBOSS CONDITION | LAMINATED STRUCTURE | NESTED | NESTED | NESTED |
| | NUMBER OF PLIES (SHEETS) | 2 | 2 | 2 |
| | AREA OF PROTRUSION (mm²) | 1.1 | 1.1 | 1.1 |
| | INTERVAL X OF PROTRUSION (mm) | 5.0 | 5.0 | 5.0 |
| | INTERVAL Y OF PROTRUSION (mm) | 5.0 | 5.0 | 5.0 |
| | HEIGHT OF PROTRUSION (mm) | 1.0 | 1.0 | 1.0 |
| | TAPER (°) | 70 | 70 | 70 |
| | SHAPE OF PROTRUSION | QUADRANGLE | QUADRANGLE | QUADRANGLE |
| | DIMENSION (mm) | 1.43 | 1.43 | 1.43 |
| | NUMBER OF PIECES (PIECE/144 cm²) | 2,090 | 2,105 | 2,090 |
| | GLUING AREA RATIO (%) | 8.4 | 8.4 | 8.4 |
| | EMBOSS VOLUME (mm²/PIECE) | 2.28 | 2.28 | 2.28 |
| | EMBOSS CAPACITY (mm²) | 10,738 | 10,759 | 10,738 |
| | NON-EMBOSSED PORTION AREA RATIO (%) | 10.8 | 10.7 | 10.8 |
| OIL ABSORPTION TEST | AMOUNT OF OIL DROPPED (g) | 1.9 | 2.0 | 2.0 |
| | TEST PIECE OIL ABSORPTION AMOUNT (g) | 1.5 | 1.6 | 1.6 |
| | BACK-OUT AMOUNT (g) | 0.2 | 0.2 | 0.2 |
| | RETURN AMOUNT (g) | 0.2 | 0.1 | 0.2 |
| | FINAL RETENTION AMOUNT (g) | 1.1 | 1.1 | 0.8 |
| | TOTAL BACK-OUT AMOUNT (g) | 0.7 | 0.7 | 1.0 |
| | TEST PIECE OIL ABSORPTION RATE (%) | 76.9 | 81.4 | 81.6 |
| | BACK-OUT RATE (%) | 12.2 | 11.0 | 10.1 |
| | RETURN RATE (%) | 10.9 | 7.6 | 8.3 |
| | FINAL RETENTION RATE (%) | 55.2 | 54.9 | 41.3 |
| | TOTAL BACK-OUT RATE (%) | 34.4 | 37.0 | 51.0 |

| | | EXAMPLE 4 | COMPARATIVE EXAMPLE 1 | COMPARATIVE EXMPLE 2 |
|---|---|---|---|---|
| ORIGINAL PAPER | PAPER WEIGHT IN GSM (g/m²) | 22.2 | 22.1 | 21.2 |
| | BULK (5-PLY) (mm) | 3.2 | 3.3 | 3.3 |
| EMBOSS CONDITION | LAMINATED STRUCTURE | NESTED | TIP TO TIP | NESTED |
| | NUMBER OF PLIES (SHEETS) | 2 | 2 | 2 |
| | AREA OF PROTRUSION (mm²) | 1.1 | 1.2 | 1.1 |
| | INTERVAL X OF PROTRUSION (mm) | 5.0 | 3.8 | 4.8 |
| | INTERVAL Y OF PROTRUSION (mm) | 5.0 | 3.7 | 4.7 |
| | HEIGHT OF PROTRUSION (mm) | 1.0 | 1.0 | 1.0 |
| | TAPER (°) | 70 | 70 | 70 |
| | SHAPE OF PROTRUSION | QUADRANGLE | QUADRANGLE | TRIANGLE |
| | DIMENSION (mm) | 1.43 | 1.10 | 1.43 |
| | NUMBER OF PIECES (PIECE/144 cm²) | 2,137 | 3,250 | 2,172 |
| | GLUING AREA RATIO (%) | 8.6 | 13.7 | 8.1 |
| | EMBOSS VOLUME (mm²/PIECE) | 2.28 | 2.18 | 2.34 |
| | EMBOSS CAPACITY (mm²) | 10,631 | 21,715 | 13,275 |
| | NON-EMBOSSED PORTION AREA RATIO (%) | 6.7 | 37.4 | 19.1 |

TABLE 1-continued

| | | | | |
|---|---|---|---|---|
| OIL ABSORPTION TEST | AMOUNT OF OIL DROPPED (g) | 2.0 | 2.0 | 2.1 |
| | TEST PIECE OIL ABSORPTION AMOUNT (g) | 1.6 | 1.5 | 1.5 |
| | BACK-OUT AMOUNT (g) | 0.2 | 0.3 | 0.3 |
| | RETURN AMOUNT (g) | 0.2 | 0.3 | 0.2 |
| | FINAL RETENTION AMOUNT (g) | 0.9 | 0.5 | 0.7 |
| | TOTAL BACK-OUT AMOUNT (g) | 0.9 | 1.2 | 1.1 |
| | TEST PIECE OIL ABSORPTION RATE (%) | 81.1 | 72.0 | 72.7 |
| | BACK-OUT RATE (%) | 10.5 | 15.2 | 15.5 |
| | RETURN RATE (%) | 8.4 | 12.8 | 11.8 |
| | FINAL RETENTION RATE (%) | 46.5 | 26.1 | 35.1 |
| | TOTAL BACK-OUT RATE (%) | 45.5 | 61.3 | 53.6 |

From Table 1, in Examples 1 to 4 (see FIGS. 1 to 18), both the oil absorption rate of the test piece and the final retention rate relative to the dropping oil amount are higher than those of Comparative Example 1 and Comparative Example 2 (see FIGS. 14 to 21).

Further, the return rate of the test piece with respect to the amount of the oil dropped is lower than that of Comparative Examples 1 and 2. Said differently, Examples 1 to 4 exhibit that the oil retention performance is good.

In particular, for Comparative Example 2 having the laminated structure of the same nested type, Examples 1 to 4 exhibit the high oil retention performance.

Further, in Examples 1 to 4, both the back-out rate and the total back-out rate with respect to the dropping oil amount are lower than in Comparative Examples 1 and 2. The results mean that Examples 1 to 4 suppress (difficult to stain out) the backing-off of the oil.

In particular, for the comparative example 2 having the same nested type in the laminated structure, Examples 1 to 4 mean that the oil is difficult to back-off.

Furthermore, even if the designability is compared, because the non-embossed portions are disposed throughout the kitchen paper 100 in Examples 1 to 4, the designability is not inferior to those of Comparative Example 1 and Comparative Example 2 where the non-embossed space exists (see FIGS. 1 to 12).

From these results, it has been found that hygienic thin-leaf paper having the shape in which the non-embossed portion formed on the first sheet does not have the intersection as in the present embodiment is excellent in absorption performance during loading while maintaining absorption performance and designability.

Although the preferred embodiments of the present invention have been described in detail, the invention is not limited to the specific embodiments, and various modifications and changes are possible within the scope of the invention described in the appended claims.

This international application claims priority under Japanese Patent Application No. 2017-39662 filed Mar. 2, 2017, the entire contents of which are hereby incorporated by reference.

EXPLANATION OF SYMBOLS

100 Kitchen paper
10 Crepe paper
EC1 Embossed protrusion
ED1 Embossed recess
NE1 Non-embossed-protrusion portion
11 First sheet region
12 Second sheet region
13 Third sheet region
14 Fourth sheet region
20 Crepe paper
EC2 Embossed protrusion
ED2 Embossed recess
NE2 Non-embossed-protrusion portion
21 Fifth sheet region
22 Sixth sheet region
23 Seventh sheet region
24 Eighth sheet region
30 Embossed portion
31 First embossed region
32 Second embossed region
33 Third embossed region
34 Fourth embossed region
40 Embossed portion
41 First embossed region
42 Second embossed region
43 Third embossed region
44 Fourth embossed region
50 Non-embossed portion
NC1 Embossed protrusion
52 Second non-embossed region
54 Fourth non-embossed region
60 Non-embossed portion
NC2 Embossed protrusion
61 First non-embossed region
63 Third non-embossed region
70 Region
71 First region
72 Second region
73 Third region
74 Fourth region

The invention claimed is:

1. A hygienic thin-leaf paper comprising:
a first sheet having front and back surfaces, on which a plurality of embossed protrusions and a plurality of embossed recesses corresponding to the plurality of embossed protrusions are respectively formed; and
a second sheet having front and back surfaces, on which a plurality of embossed protrusions and a plurality of embossed recesses corresponding to the plurality of embossed protrusions are respectively formed,
wherein the first sheet and the second sheet are integrated by facing the surfaces formed with the embossed protrusions in a nested form,
wherein each of the first sheet and the second sheet have an embossed portion, on which the plurality of embossed protrusions and a plurality of non-embossed-protrusion portions are formed,
wherein at least one of the first sheet and the second sheets have a non-embossed portion, on which the plurality of embossed protrusions and the plurality of non-embossed-protrusion portions are not formed, and
wherein the non-embossed portion is shaped like an elongated rectangle, the non-embossed portion includes a plurality of non-embossed portions, and a shared area formed by intersecting the plurality of non-embossed portions is not present, and wherein each direction of line symmetry axes of the plurality of non-embossed portions coincides with any one direction from among two orthogonal directions.

2. The hygienic thin-leaf paper as claimed in claim 1,
wherein a space, in which the plurality of non-embossed portions are opposed to each other, is not formed.

3. The hygienic thin-leaf paper as claimed in claim 1,
wherein the first sheet has the non-embossed portion, and
wherein the second sheet does not have the non-embossed portion.

4. The hygienic thin-leaf paper as claimed in claim 3,
wherein the first sheet and the second sheet each have two or more sheet regions,
wherein a non-embossed region including the non-embossed portion is formed on at least one sheet region from among the two or more sheet regions of the first sheet, and
only an embossed region without having the non-embossed portion is formed on at least one sheet region from among the two or more sheet regions of the second sheet.

5. The hygienic thin-leaf paper as claimed in claim 3,
wherein the non-embossed portion is formed of a plurality of patterns.

6. The hygienic thin-leaf paper as claimed in claim 5,
wherein two adjacent patterns from among the plurality of patterns are in a rotational symmetry of 360°/n (n is an integer of one or greater).

7. The hygienic thin-leaf paper as claimed in claim 5,
wherein two adjacent patterns from among the plurality of patterns are in a point symmetry.

8. The hygienic thin-leaf paper as claimed in claim 1,
wherein an area ratio that is a ratio of an area of the non-embossed portion relative to one surface area of the first and second sheets is 3 to 16%.

9. The hygienic thin-leaf paper as claimed in claim 1,
wherein the first sheet includes a first embossed portion having a plurality of embossed protrusions and a plurality of non-embossed-protrusion portions formed, and a first non-embossed portion without having the plurality of embossed protrusions and the plurality of non-embossed-protrusion portions,
wherein the second sheet includes a second embossed portion having a plurality of embossed protrusions and a plurality of non-embossed-protrusion portions formed, and a second non-embossed portion without having the plurality of embossed protrusions and the plurality of non-embossed-protrusion portions,
wherein the first non-embossed portion faces the second embossed portion, and
wherein the second non-embossed portion faces the first embossed portion.

10. The hygienic thin-leaf paper as claimed in claim 9,
wherein the first sheet and the second sheet each have two or more sheet regions,
wherein the sheet region of the first sheet is formed with a first embossed region without having the first non-embossed portion and a first non-embossed region having the first non-embossed portion,
wherein the sheet region of the second sheet is formed with a second embossed region without having the second non-embossed portion and a second non-embossed region having the second non-embossed portion, and
wherein the first non-embossed region and the second non-embossed region are arranged so as not to overlap.

11. The hygienic thin-leaf paper as claimed in claim 9,
wherein the pattern of the first non-embossed portion facing the second embossed portion and the pattern of the second non-embossed portion facing the first embossed portion are in a rotational symmetry 90°×n (n is an odd number).

12. The hygienic thin-leaf paper as claimed in claim 9,
wherein a pattern of the first non-embossed portion facing the second embossed portion and a pattern of the second non-embossed portion facing the first embossed portion are in a linear symmetry.

13. The hygienic thin-leaf paper as claimed in claim 9,
wherein an area ratio of the first non-embossed portion to the second non-embossed portion is 3 to 16%.

\* \* \* \* \*